(12) United States Patent
Sasaki et al.

(10) Patent No.: US 8,830,799 B1
(45) Date of Patent: Sep. 9, 2014

(54) NEAR-FIELD LIGHT GENERATOR AND THERMALLY-ASSISTED MAGNETIC RECORDING HEAD

(71) Applicants: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Seiichiro Tomita, Milpatis, CA (US); Ryuji Fujii, Hong Kong (CN)

(72) Inventors: Yoshitaka Sasaki, Santa Clara, CA (US); Hiroyuki Ito, Milpitas, CA (US); Shigeki Tanemura, Milpitas, CA (US); Hironori Araki, Milpitas, CA (US); Seiichiro Tomita, Milpatis, CA (US); Ryuji Fujii, Hong Kong (CN)

(73) Assignees: Headway Technologies, Inc., Milpitas, CA (US); SAE Magnetics (H.K. Ltd), Hong Kong (CN)

( * ) Notice: Subject to any disclaimer, the term of this patent is extended or adjusted under 35 U.S.C. 154(b) by 0 days.

(21) Appl. No.: 13/846,337

(22) Filed: Mar. 18, 2013

(51) Int. Cl.
*G11B 11/00* (2006.01)
*G02B 5/00* (2006.01)
*G11B 13/08* (2006.01)
*G02B 27/56* (2006.01)

(52) U.S. Cl.
CPC .............. *G11B 13/08* (2013.01); *G02B 5/008* (2013.01); *G02B 27/56* (2013.01)
USPC ...................................................... 369/13.33

(58) Field of Classification Search
USPC ........ 369/13.02, 13.13, 13.32, 13.33; 360/59; 29/603.07–603.27; 428/815
See application file for complete search history.

(56) References Cited

U.S. PATENT DOCUMENTS

| | | | | |
|---|---|---|---|---|
| 7,106,664 B2 * | 9/2006 | Hasegawa et al. | ......... | 369/13.33 |
| 7,444,054 B2 * | 10/2008 | Challener | ...................... | 385/129 |
| 7,864,434 B2 * | 1/2011 | Peng | .............................. | 359/642 |
| 8,208,214 B2 * | 6/2012 | Iwata et al. | ...................... | 360/59 |
| 8,243,558 B2 * | 8/2012 | Komura et al. | ............ | 369/13.33 |
| 8,488,419 B1 * | 7/2013 | Jin et al. | ...................... | 369/13.32 |
| 2008/0056660 A1 | 3/2008 | Lee et al. | | |
| 2009/0295510 A1 | 12/2009 | Miyazaki et al. | | |
| 2011/0038236 A1 | 2/2011 | Mizuno et al. | | |
| 2011/0170381 A1 | 7/2011 | Matsumoto | | |
| 2011/0249546 A1 * | 10/2011 | Choo et al. | ............... | 369/112.18 |
| 2011/0286128 A1 | 11/2011 | Tsutsumi et al. | | |
| 2012/0008229 A1 | 1/2012 | Zhou et al. | | |
| 2013/0148485 A1 | 6/2013 | Jin et al. | | |
| 2013/0279315 A1 * | 10/2013 | Zhao et al. | ................. | 369/13.33 |
| 2013/0320470 A1 | 12/2013 | Nakajima et al. | | |

OTHER PUBLICATIONS

U.S. Appl. No. 13/846,278, filed Mar. 18, 2013 in the name of Yoshitaka Sasaki et al.
U.S. Appl. No. 13/942,074, filed Jul. 15, 2013 in the name of Yoshitaka Sasaki et al.
May 9, 2014 Office Action issued in U.S. Appl. No. 13/846,278.

* cited by examiner

*Primary Examiner* — Brenda Bernardi
(74) *Attorney, Agent, or Firm* — Oliff PLC

(57) ABSTRACT

A near-field light generator includes a multilayer structure having a front end face. The multilayer structure includes a first dielectric layer, a second dielectric layer, a third dielectric layer, a first metal layer, and a second metal layer. The first metal layer is interposed between the first dielectric layer and the second dielectric layer. The second metal layer is interposed between the second dielectric layer and the third dielectric layer. Each of the first to third dielectric layers and the first and second metal layers has an end located in the front end face. The dielectric material used to form the first dielectric layer, the dielectric material used to form the second dielectric layer, and the dielectric material used to form the third dielectric layer have the same permittivity.

6 Claims, 14 Drawing Sheets

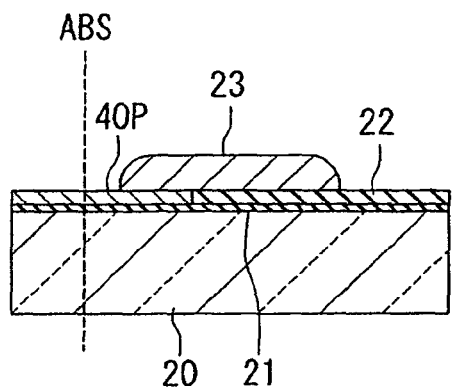
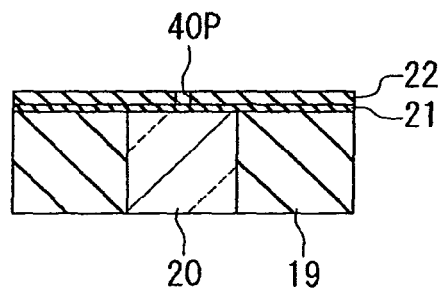
FIG. 10A     FIG. 10B
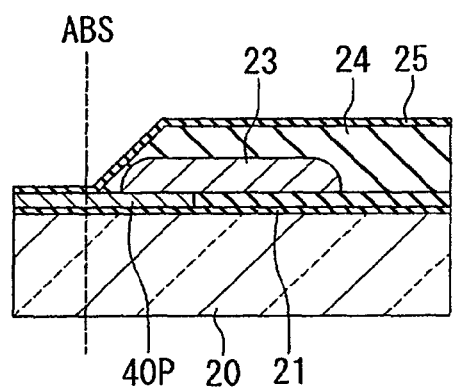
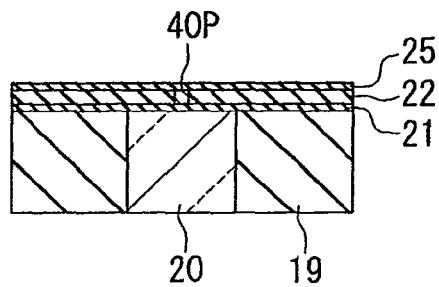
FIG. 11A     FIG. 11B

NEAR-FIELD LIGHT GENERATOR AND THERMALLY-ASSISTED MAGNETIC RECORDING HEAD

BACKGROUND OF THE INVENTION

1. Field of the Invention

The present invention relates to a near-field light generator for use in thermally-assisted magnetic recording where a recording medium is irradiated with near-field light to lower the coercivity of the recording medium for data writing, and to a thermally-assisted magnetic recording head including the near-field light generator.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, a thin-film magnetic head is mounted on a slider that flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically guided through a waveguide, which is provided in the slider, to the plasmon generator disposed near a medium facing surface of the slider.

The plasmon generator has a front end face located in the medium facing surface. The front end face generates near-field light. Surface plasmons are excited on the plasmon generator and are propagated along the surface of the plasmon generator to reach the front end face. As a result, the surface plasmons concentrate at the front end face, and near-field light is generated from the front end face based on the surface plasmons.

U.S. Patent Application Publication No. 2011/0170381 A1 discloses a technology in which the surface of a waveguide and the surface of a metallic structure (plasmon generator) are arranged to face each other with a gap therebetween, and evanescent light that occurs at the surface of the waveguide based on the light propagated through the waveguide is used to excite surface plasmons on the metallic structure, so that near-field light is generated based on the excited surface plasmons. Further, U.S. Patent Application Publication No. 2011/0170381 A1 discloses forming a part of the metallic structure from a material different from that of other parts of the metallic structure.

Materials that are typically employed for plasmon generators are metals having high electrical conductivities, such as Au and Ag. However, Au and Ag are relatively soft and have relatively high thermal expansion coefficients. Thus, if a plasmon generator is made up of only one layer of Au or Ag, there are problems as described below.

Part of the energy of light guided to the plasmon generator through the waveguide is transformed into heat in the plasmon generator. Part of the energy of near-field light generated by the plasmon generator is also transformed into heat in the plasmon generator. The plasmon generator thus increases in temperature during the operation of the thermally-assisted magnetic recording head. In the case of a plasmon generator made up of only one layer, the heat generated as described above tends to concentrate into the plasmon generator, thereby causing a significant increase in the temperature of the plasmon generator.

The plasmon generator made up of only one layer of Au or Ag will expand and significantly protrude toward the recording medium when the temperature of the plasmon generator increases. As a result, a protective film covering the medium facing surface may come into contact with the recording medium. This may cause damage to the recording medium or cause the protective film to be broken. When the protective film is broken, the plasmon generator may be damaged by contact with the recording medium or may be corroded by contact with high temperature air.

Further, the plasmon generator made up of only one layer of Au or Ag may be deformed due to aggregation when its temperature increases. In addition, such a plasmon generator expands when its temperature increases and then contracts when its temperature decreases. When the plasmon generator undergoes such a process, the front end face of the plasmon generator may be significantly recessed relative to the other parts of the medium facing surface. In such a case, the heating performance of the plasmon generator is degraded.

For the various reasons described above, the plasmon generator made up of only one layer of Au or Ag has the drawback of being low in reliability.

U.S. Patent Application Publication No. 2011/0170381 A1 discloses a metallic structure composed of a main body and a layer having a greater hardness than the main body (this layer will hereinafter be referred to as the hard layer). In this metallic structure, the main body is not exposed in the medium facing surface, but the hard layer is exposed in the medium facing surface. In this metallic structure, surface plasmons are generated in the main body. The generated surface plasmons are propagated to the hard layer, and near-field light is generated from the vertex of the hard layer. This metallic structure has the drawback that there is a great loss of the surface plasmons as they are propagated from the main body to the hard layer, and it is thus difficult to efficiently propagate the surface plasmons to to the vertex.

OBJECT AND SUMMARY OF THE INVENTION

It is an object of the present invention to provide a near-field light generator of high reliability that is capable of propagating surface plasmons to the front end face efficiently, and to provide a thermally-assisted magnetic recording head having such a near-field light generator.

A near-field generator of the present invention includes a multilayer structure having a front end face. The multilayer structure includes a first dielectric layer, a second dielectric layer, a third dielectric layer, a first metal layer, and a second metal layer. The first metal layer is interposed between the first dielectric layer and the second dielectric layer. The second metal layer is interposed between the second dielectric layer and the third dielectric layer. Each of the first to third dielectric layers and the first and second metal layers has an end located in the front end face. Each of the first and second metal layers is formed of a metal material. Each of the first to third dielectric layers is formed of a dielectric material. The dielectric material used to form the first dielectric layer, the dielectric material used to form the second dielectric layer, and the dielectric material used to form the third dielectric layer have the same permittivity. The near-field light generator is configured so that the first metal layer propagates a first surface plasmon, the second metal layer propagates a second surface plasmon, and the front end face generates near-field light based on the first and second surface plasmons.

A thermally-assisted magnetic recording head of the present invention includes: a medium facing surface facing a recording medium; a main pole that produces a write magnetic field for writing data on the recording medium; a core through which light is propagated; and a near-field light generator. The near-field light generator includes a multilayer structure having a front end face located in the medium facing surface. The multilayer structure includes a first dielectric layer, a second dielectric layer, a third dielectric layer, a first metal layer, and a second metal layer. The first metal layer is interposed between the first dielectric layer and the second dielectric layer. The second metal layer is interposed between the second dielectric layer and the third dielectric layer. Each of the first to third dielectric layers and the first and second metal layers has an end located in the front end face. Each of the first and second metal layers is formed of a metal material. Each of the first to third dielectric layers is formed of a dielectric material. The dielectric material used to form the first dielectric layer, the dielectric material used to form the second dielectric layer, and the dielectric material used to form the third dielectric layer have the same permittivity. The near-field light generator is configured so that the first metal layer propagates a first surface plasmon that is excited based on the light propagated through the core, the second metal layer propagates a second surface plasmon that is excited based on the light propagated through the core, and the front end face generates near-field light based on the first and second surface plasmons.

In the near-field light generator and the thermally-assisted magnetic recording head of the present invention, the dielectric material used to form the first dielectric layer, the dielectric material used to form the second dielectric layer, and the dielectric material used to form the third dielectric layer may be the same. Further, the dielectric material used to form the first dielectric layer, the dielectric material used to form the second dielectric layer, and the dielectric material used to form the third dielectric layer may be higher in Vickers hardness than the metal material used to form the first metal layer and the metal material used to form the second metal layer. Each of the first metal layer and the second metal layer may have a thickness in the range of 5 to 20 nm.

The near-field light generator of the present invention may further include a core through which light is propagated. In this case, the first and second surface plasmons are excited based on the light propagated through the core. The core may have an evanescent light generating surface that generates evanescent light based on the light propagated through the core. The first dielectric layer may include an interposition part interposed between the evanescent light generating surface and the first metal layer. The first and second surface plasmons may be excited based on the evanescent light generated from the evanescent light generating surface.

Where the near-field light generator of the present invention includes the core, the core may have a first evanescent light generating surface and a second evanescent light generating surface opposed to each other with a predetermined distance therebetween. The first evanescent light generating surface generates first evanescent light based on the light propagated through the core, and the second evanescent light generating surface generates second evanescent light based on the light propagated through the core. The multilayer structure is interposed between the first evanescent light generating surface and the second evanescent light generating surface. The first dielectric layer may include a first interposition part interposed between the first evanescent light generating surface and the first metal layer. The third dielectric layer may include a second interposition part interposed between the second evanescent light generating surface and the second metal layer. In this case, the first surface plasmon is excited based on the first evanescent light, and the second surface plasmon is excited based on the second evanescent light.

In the thermally-assisted magnetic recording head of the present invention, the core may have an evanescent light generating surface that generates evanescent light based on the light propagated through the core. The first dielectric layer may include an interposition part interposed between the evanescent light generating surface and the first metal layer. The first and second surface plasmons are excited based on the evanescent light generated from the evanescent light generating surface.

In the thermally-assisted magnetic recording head of the present invention, the core may have a first evanescent light generating surface and a second evanescent light generating surface opposed to each other with a predetermined distance therebetween. The first evanescent light generating surface generates first evanescent light based on the light propagated through the core, and the second evanescent light generating surface generates second evanescent light based on the light propagated through the core. The multilayer structure is interposed between the first evanescent light generating surface and the second evanescent light generating surface. The first dielectric layer may include a first interposition part interposed between the first evanescent light generating surface and the first metal layer. The third dielectric layer may include a second interposition part interposed between the second evanescent light generating surface and the second metal layer. In this case, the first surface plasmon is excited based on the first evanescent light, and the second surface plasmon is excited based on the second evanescent light.

According to the present invention, it is possible to provide a near-field light generator of high reliability that is capable of propagating surface plasmons to the front end face efficiently, and to provide a thermally-assisted magnetic recording head having such a near-field light generator.

Other and further objects, features and advantages of the present invention will appear more fully from the following description.

BRIEF DESCRIPTION OF THE DRAWINGS

FIG. 10A and FIG. 10B are cross-sectional views showing a step that follows the step shown in FIG. 9A and FIG. 9B.

FIG. 11A and FIG. 11B are cross-sectional views showing a step that follows the step shown in FIG. 10A and FIG. 10B.

DETAILED DESCRIPTION OF THE PREFERRED EMBODIMENTS

First Embodiment

Figure 5:
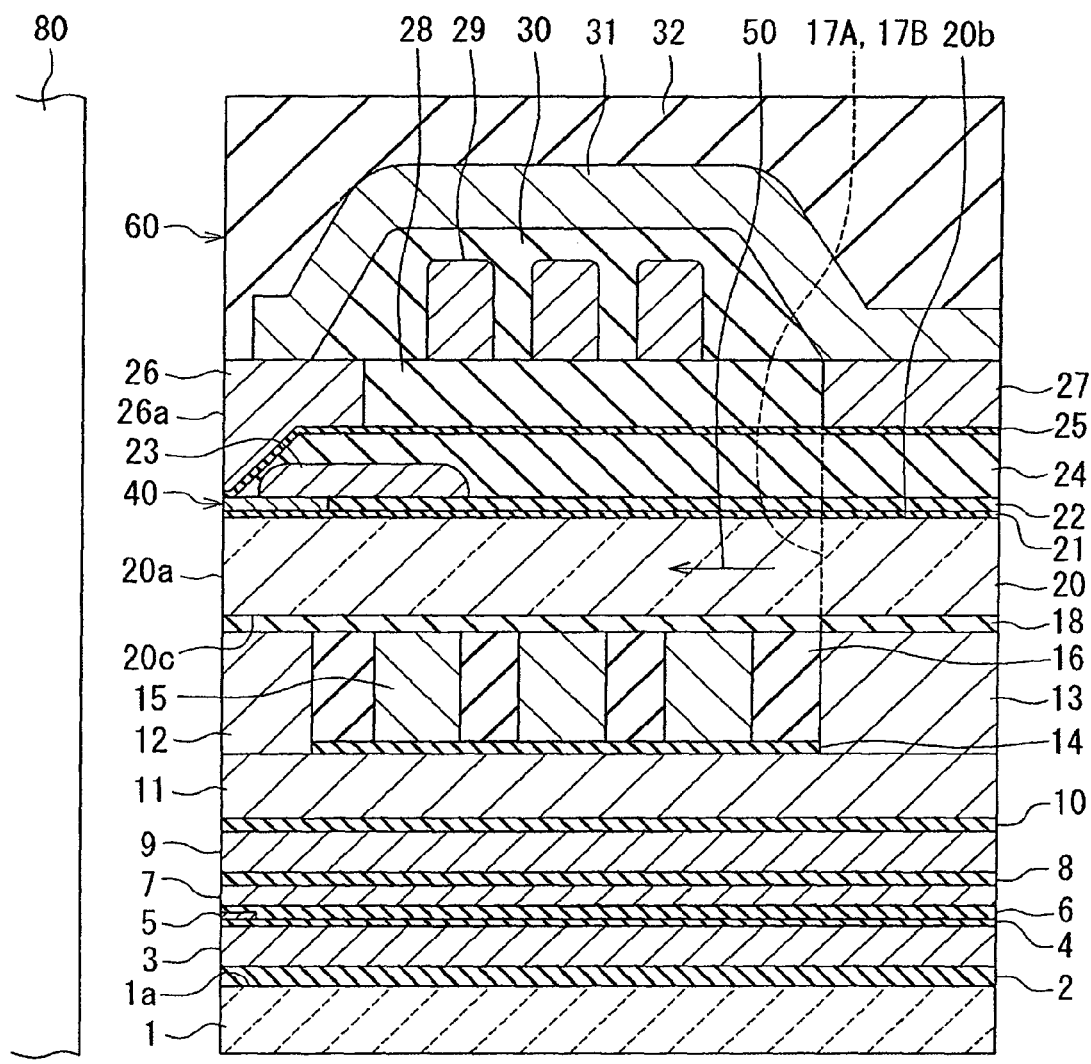
FIG. 5 is a cross-sectional view showing the configuration of the thermally-assisted magnetic recording head according to the first embodiment of the invention.
Figure 6:
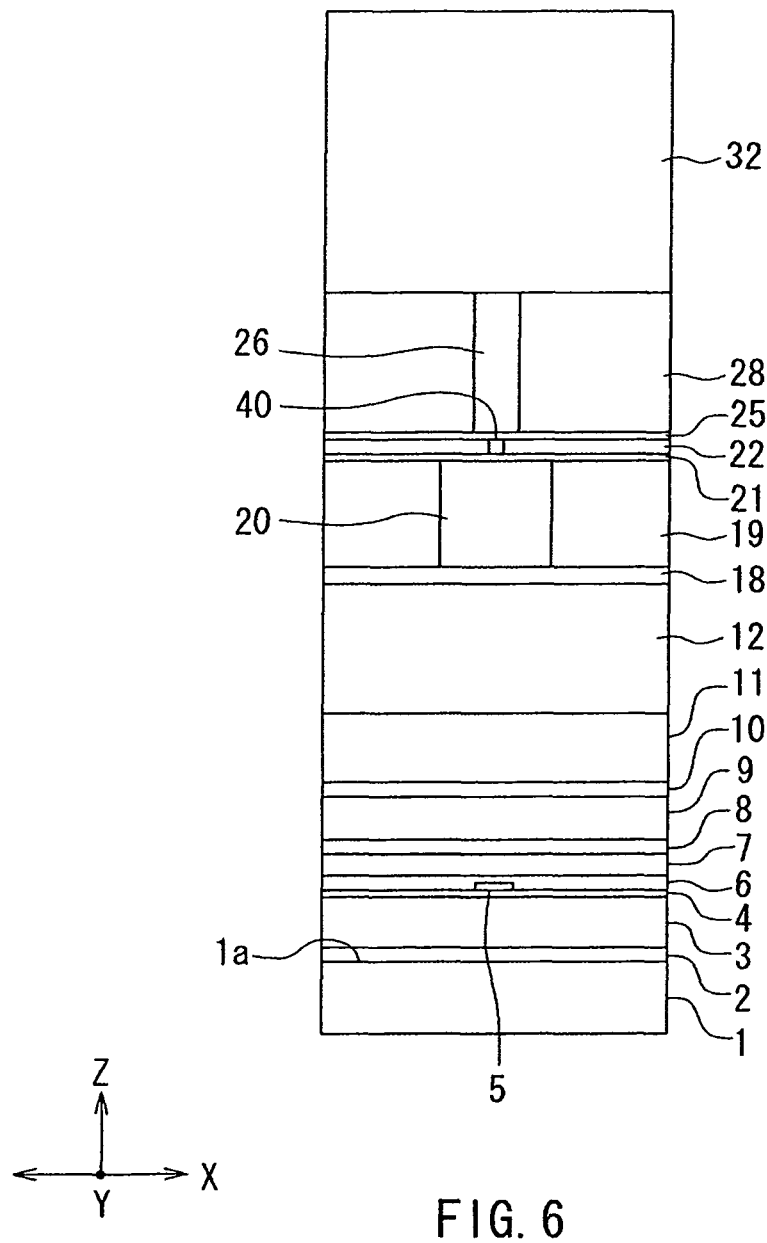
FIG. 6 is a front view showing the medium facing surface of the thermally-assisted magnetic recording head according to the first embodiment of the invention.

Preferred embodiments of the present invention will now be described in detail with reference to the drawings. First, reference is made to FIG. 5 and FIG. 6 to describe the configuration of a thermally-assisted magnetic recording head according to a first embodiment of the invention. The thermally-assisted magnetic recording head according to the present embodiment includes a near-field light generator according to the present embodiment. FIG. 5 is a cross-sectional view showing the configuration of the thermally-assisted magnetic recording head. FIG. 6 is a front view showing the medium facing surface of the thermally-assisted magnetic recording head.

The thermally-assisted magnetic recording head according to the present embodiment is for use in perpendicular magnetic recording, and is in the form of a slider to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 5, the thermally-assisted magnetic recording head has a medium facing surface 60 facing a recording medium 80. Here, X direction, Y direction, and Z direction will be defined as follows. The X direction is the direction across the tracks of the recording medium 80, i.e., the track width direction. The Y direction is a direction perpendicular to the medium facing surface 60. The Z direction is the direction of travel of the recording medium 80 as viewed from the slider. The X, Y, and Z directions are orthogonal to one another.

As shown in FIG. 5 and FIG. 6, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not illustrated) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

An end of the MR element 5 is located in the medium facing surface 60. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The parts from the bottom shield layer 3 to the top shield layer 7 constitute a read head section. The thermally-assisted magnetic recording head further includes an insulating layer 8 disposed on the top shield layer 7, a middle shield layer 9 formed of a magnetic material and disposed on the insulating layer 8, and a nonmagnetic layer 10 formed of a nonmagnetic material and disposed on the middle shield layer 9. The insulating layer 8 and the nonmagnetic layer 10 are formed of alumina, for example.

The thermally-assisted magnetic recording head further includes a return pole layer 11 formed of a magnetic material and disposed on the nonmagnetic layer 10, and an insulating layer (not illustrated) disposed on the nonmagnetic layer 10 and surrounding the return pole layer 11. The return pole layer 11 has an end face located in the medium facing surface 60. The non-illustrated insulating layer is formed of alumina, for example.

The thermally-assisted magnetic recording head further includes a shield layer 12 located close to the medium facing surface 60 and lying on a part of the return pole layer 11, a coupling layer 13 located apart from the medium facing surface 60 and lying on another part of the return pole layer 11, an insulating layer 14 lying on the remaining part of the return pole layer 11 and on the non-illustrated insulating layer, and a coil 15 lying on the insulating layer 14. The shield layer 12 and the coupling layer 13 are each formed of a magnetic material. The shield layer 12 has an end face located in the medium facing surface 60. The coil 15 is planar spiral-shaped and wound around the coupling layer 13. The coil 15 is formed of a conductive material such as copper. The insulating layer 14 is formed of alumina, for example.

The thermally-assisted magnetic recording head further includes an insulating layer 16 disposed around the shield layer 12, the coupling layer 13 and the coil 15 and in the space between every adjacent turns of the coil 15, and two coupling portions 17A and 17B disposed on the coupling layer 13. The coupling portions 17A and 17B are each formed of a magnetic material. Each of the coupling portions 17A and 17B has a first layer located on the coupling layer 13, and a second and a third layer stacked in this order on the first layer. The first layer of the coupling portion 17A and the first layer of the coupling portion 17B are disposed to be aligned in the track width direction (the X direction). The insulating layer 16 is formed of alumina, for example.

The thermally-assisted magnetic recording head further includes a waveguide. The waveguide includes a core 20 through which light is propagated, and a cladding provided around the core 20. The core 20 will be described in detail later.

The cladding includes cladding layers 18, 19, and 21. The cladding layer 18 is disposed over the shield layer 12, the coupling layer 13, the coil 15, and the insulating layer 16. The core 20 is disposed on the cladding layer 18. The cladding layer 19 is disposed on the cladding layer 18 and surrounds the core 20. The cladding layer 21 is disposed over the core 20 and the cladding layer 19.

The core 20 is formed of a dielectric material that transmits laser light to be used for generating near-field light. The laser light emitted from a laser diode (not illustrated) enters the core 20 and is propagated through the core 20. The cladding layers 18, 19, and 21 are each formed of a dielectric material that has a refractive index lower than that of the core 20. For example, the core 20 may be formed of tantalum oxide such as $Ta_2O_5$ or silicon oxynitride (SiON), while the cladding layers 18, 19, and 21 may be formed of silicon dioxide ($SiO_2$) or alumina.

The first layers of the coupling portions 17A and 17B are embedded in the cladding layer 18. The second layers of the coupling portions 17A and 17B are embedded in the cladding layer 19. The second layer of the coupling portion 17A and the second layer of the coupling portion 17B are located on opposite sides of the core 20 in the track width direction (the X direction), each being at a distance from the core 20.

The thermally-assisted magnetic recording head further includes a main pole 26 disposed above the core 20 in the vicinity of the medium facing surface 60, and a plasmon generator 40 interposed between the core 20 and the main pole 26. The plasmon generator 40 is configured to excite surface plasmons on the principle to be described later. The plasmon generator 40 will be described in detail later.

The main pole 26 has an end face 26a located in the medium facing surface 60. The main pole 26 may include a narrow portion having the end face 26a and an end portion opposite to the end face 26a, and a wide portion connected to the end portion of the narrow portion. The wide portion is greater than the narrow portion in width in the track width direction (the X direction).

The thermally-assisted magnetic recording head further includes a dielectric layer 22 lying on the cladding layer 21 and surrounding the plasmon generator 40, a heat sink 23 lying astride part of the plasmon generator 40 and part of the dielectric layer 22, a dielectric layer 24 disposed to cover the heat sink 23, and a dielectric layer 25 disposed to cover the plasmon generator 40 and the dielectric layer 24. The maximum thickness of the heat sink 23 is in the range of 200 to 500 nm, for example. The dielectric layer 24 has a top surface, and an end face closest to the medium facing surface 60. The distance from the medium facing surface 60 to an arbitrary point on the aforementioned end face of the dielectric layer 24 decreases with decreasing distance from the arbitrary point to the top surface 1a of the substrate 1. The maximum thickness of the dielectric layer 24 is in the range of 500 to 800 nm, for example.

The main pole 26 is disposed on the dielectric layer 25 so as to lie above part of each of the top surface of the plasmon generator 40, the end face of the dielectric layer 24 and the top surface of the dielectric layer 24. The dielectric layer 25 has a thickness in the range of, for example, 10 to 40 nm, preferably in the range of 15 to 25 nm.

The third layers of the coupling portions 17A and 17B are embedded in the cladding layer 21 and the dielectric layers 22, 24, and 25. The dielectric layers 22, 24, and 25 may be formed of $SiO_2$ or alumina, for example. The heat sink 23 is formed of a material having a high thermal conductivity, such as Au, Ag, Al, or Cu. The heat sink 23 has the function of dissipating heat generated at the plasmon generator 40. The heat sink 23 is not an essential component of the thermally-assisted magnetic recording head, and can be dispensed with.

The thermally-assisted magnetic recording head further includes a coupling layer 27 formed of a magnetic material and disposed over the third layers of the coupling portions 17A and 17B and the dielectric layer 25, and a dielectric layer 28 disposed around the main pole 26 and the coupling layer 27. The top surfaces of the main pole 26, the coupling layer 27, and the dielectric layer 28 are even with each other. The dielectric layer 28 is formed of alumina, for example.

The thermally-assisted magnetic recording head further includes a coil 29 disposed on the dielectric layer 28, an insulating layer 30 disposed to cover the coil 29, and a yoke layer 31 formed of a magnetic material and disposed over the main pole 26, the coupling layer 27 and the insulating layer 30. The yoke layer 31 magnetically couples the main pole 26 and the coupling layer 27 to each other. The coil 29 is planar spiral-shaped and wound around a part of the yoke layer 31 that lies on the coupling layer 27. The coil 29 is formed of a conductive material such as copper. The insulating layer 30 is formed of alumina, for example.

The thermally-assisted magnetic recording head further includes a protective layer 32 disposed to cover the yoke layer 31. The protective layer 32 is formed of alumina, for example.

The parts from the return pole layer 11 to the yoke layer 31 constitute a write head section. The coils 15 and 29 produce magnetic fields corresponding to data to be written on the recording medium 80. The shield layer 12, the return pole layer 11, the coupling layer 13, the coupling portions 17A and 17B, the coupling layer 27, the yoke layer 31, and the main pole 26 form a magnetic path for passing magnetic fluxes corresponding to the magnetic fields produced by the coils 15 and 29. The coils 15 and 29 are connected in series or in parallel so that the magnetic flux corresponding to the magnetic field produced by the coil 15 and the magnetic flux corresponding to the magnetic field produced by the coil 29 flow in the same direction through the main pole 26. The main pole 26 allows the magnetic flux corresponding to the magnetic field produced by the coil 15 and the magnetic flux corresponding to the magnetic field produced by the coil 29 to pass, and produces a write magnetic field for writing data on the recording medium 80 by means of a perpendicular magnetic recording system.

As has been described, the thermally-assisted magnetic recording head according to the present embodiment includes the medium facing surface 60, the read head section, and the write head section. The read head section and the write head section are stacked on the substrate 1. The write head section is located on the front side in the direction of travel of the recording medium 80 (the Z direction), i.e., on the trailing side, relative to the read head section.

The thermally-assisted magnetic recording head may include a protective film covering the medium facing surface 60. The protective film is formed of diamond-like-carbon (DLC) or $Ta_2O_5$, for example. The protective film is not an essential component of the thermally-assisted magnetic recording head and can be dispensed with.

The write head section includes the coils 15 and 29, the main pole 26, the waveguide, and the plasmon generator 40. The waveguide includes the core 20 and the cladding. The cladding includes the cladding layers 18, 19, and 21. The main pole 26 is located on the front side in the direction of travel of the recording medium 80 (the Z direction) relative to the core 20. The plasmon generator 40 is interposed between the core 20 and the main pole 26.

Figure 1:
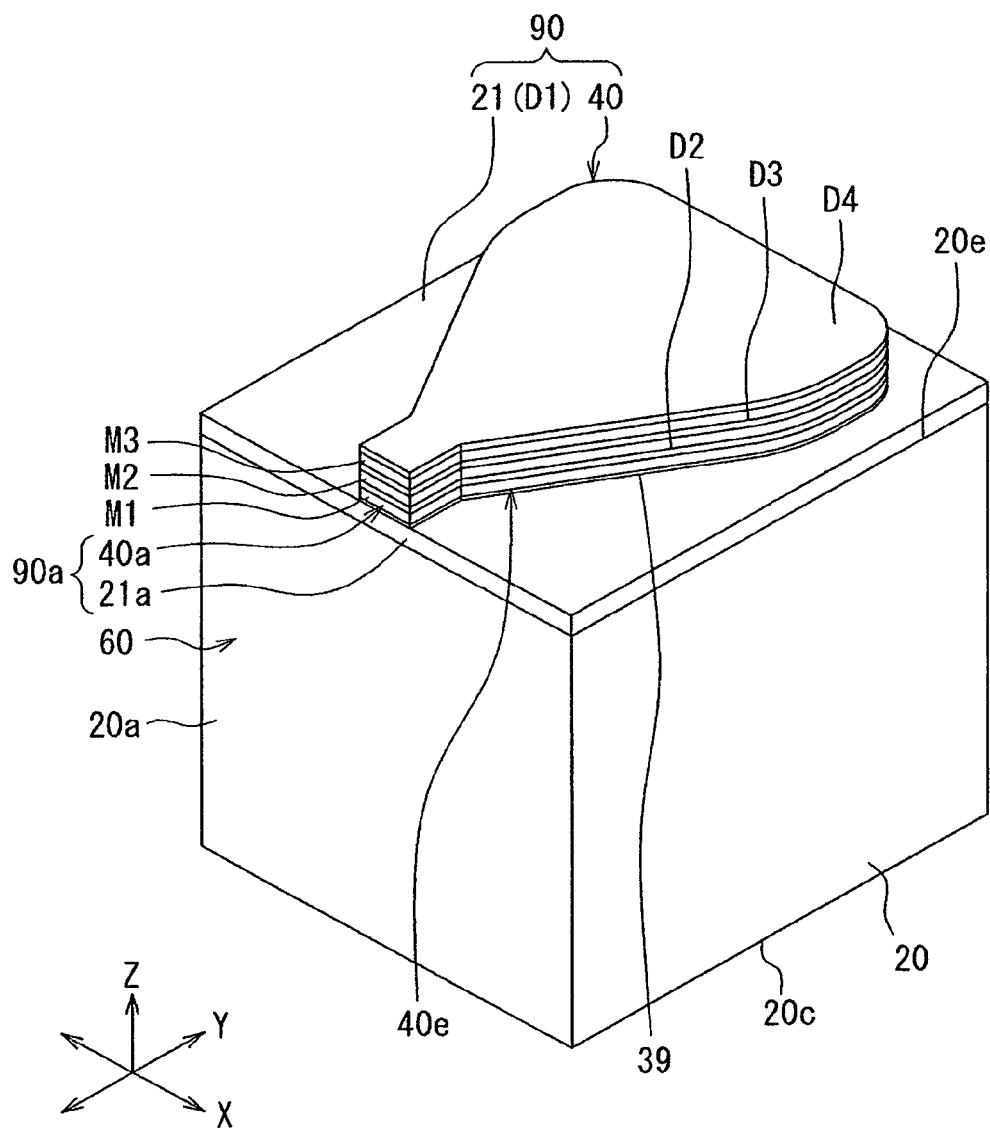
FIG. 1 is a perspective view showing a near-field light generator according to a first embodiment of the invention.
Figure 2:
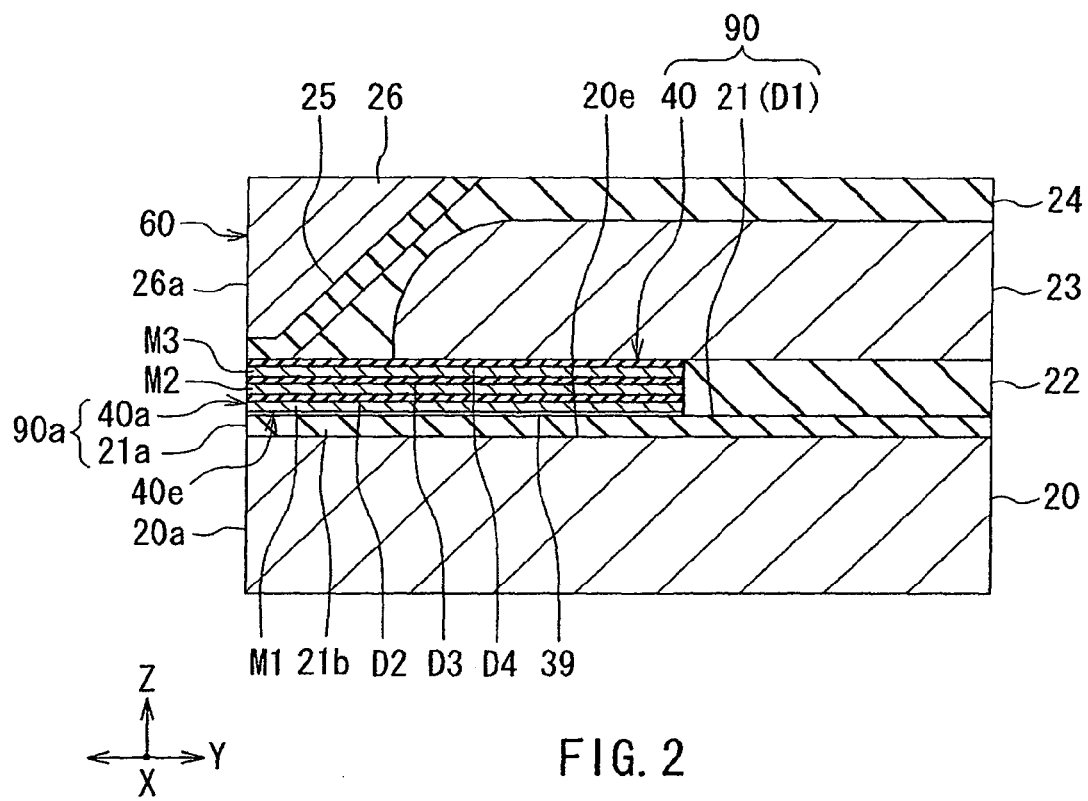
FIG. 2 is a cross-sectional view showing the main part of a thermally-assisted magnetic recording head according to the first embodiment of the invention.
Figure 3:
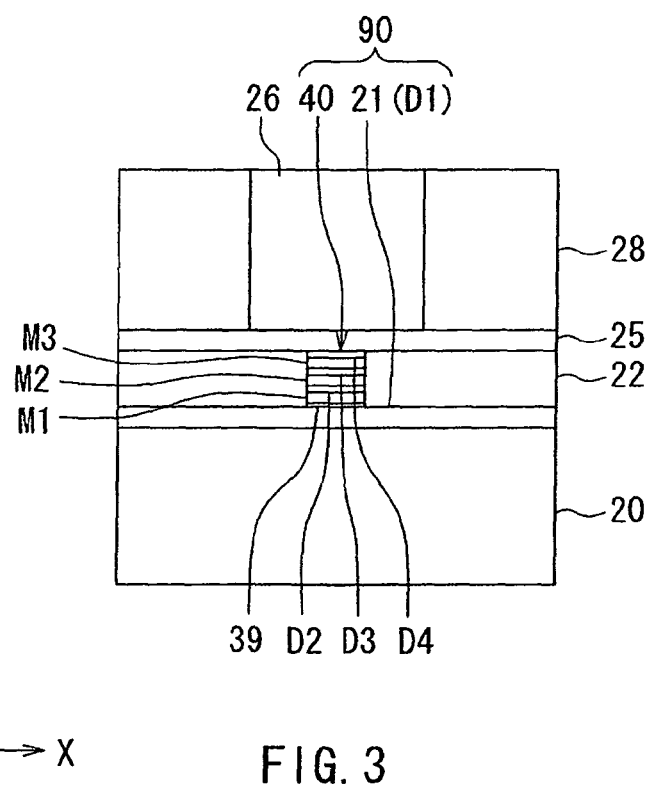
FIG. 3 is a front view showing part of the medium facing surface of the thermally-assisted magnetic recording head according to the first embodiment of the invention.
Figure 4:
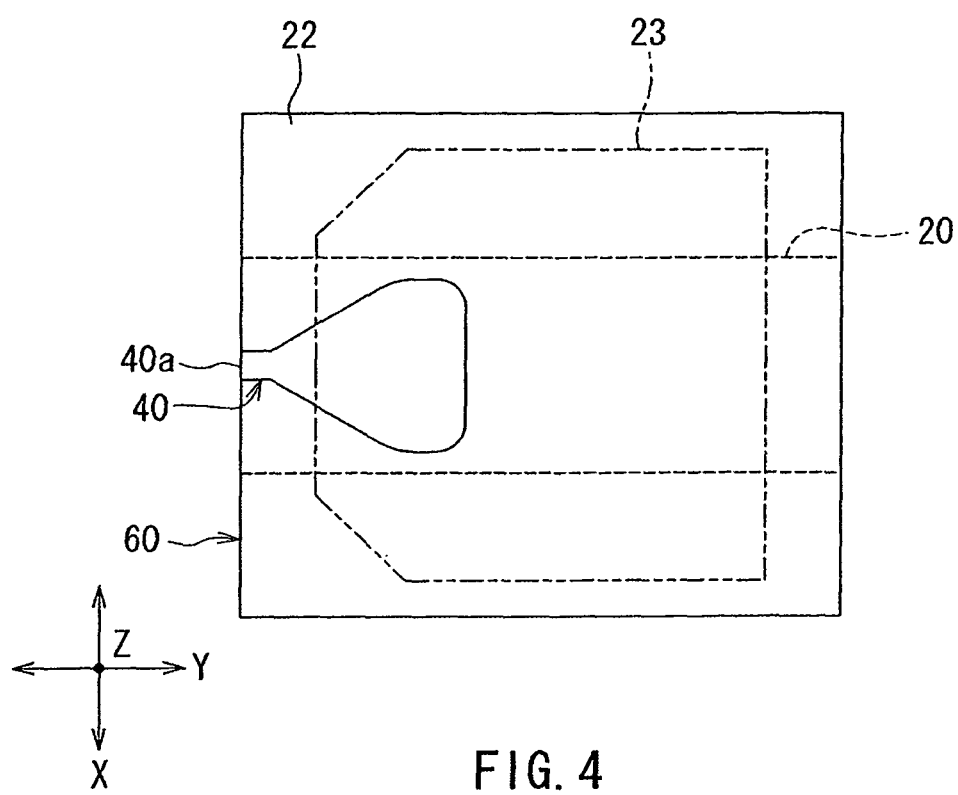
FIG. 4 is a plan view showing the positional relationship between the plasmon generator and the core of the waveguide shown in FIG. 1.

The near-field light generator according to the present embodiment will now be described in detail with reference to FIG. 1 to FIG. 4. FIG. 1 is a perspective view showing the near-field light generator according to the present embodiment. FIG. 2 is a cross-sectional view showing the main part of the thermally-assisted magnetic recording head according to the present embodiment. FIG. 3 is a front view showing part of the medium facing surface 60 of the thermally-assisted magnetic recording head according to the present embodiment. FIG. 4 is a plan view showing the positional relationship between the plasmon generator 40 and the core 20 of the waveguide shown in FIG. 1.

As shown in FIG. 1, the near-field light generator according to the present embodiment includes a multilayer structure 90 and the core 20. The multilayer structure 90 includes the cladding layer 21 and the plasmon generator 40.

As shown in FIG. 1, the core 20 has an end face 20a located in the medium facing surface 60, an evanescent light generating surface 20e or a top surface, a bottom surface 20c, and two side surfaces. The evanescent light generating surface 20e generates evanescent light based on the light propagated through the core 20. The cladding layer 21 covers the evanescent light generating surface 20e. The cladding layer 21 has an end 21a located in the medium facing surface 60.

As shown in FIG. 1 and FIG. 2, the plasmon generator 40 has a front end face 40a and a core facing surface 40e. The front end face 40a is located in the medium facing surface 60. The core facing surface 40e faces a surface of the core 20, particularly the evanescent light generating surface 20e.

The multilayer structure 90 has a front end face 90a located in the medium facing surface 60. The front end face 90a is composed of the end 21a of the cladding layer 21 and the front end face 40a of the plasmon generator 40.

The cladding layer 21 corresponds to the first dielectric layer of the present invention. Thus, hereinafter the cladding layer 21 will also be referred to as the first dielectric layer D1.

The plasmon generator 40 includes at least a first metal layer M1, a second metal layer M2, a second dielectric layer D2, and a third dielectric layer D3. In the example shown in FIG. 1 to FIG. 3, the plasmon generator 40 includes a third metal layer M3 and a fourth dielectric layer D4 in addition to the metal layers M1 and M2 and the dielectric layers D2 and D3 mentioned above. In this example, the metal layer M1, the dielectric layer D2, the metal layer M2, the dielectric layer D3, the metal layer M3, and the dielectric layer D4 are stacked in this order on the first dielectric layer D1 (the cladding layer 21). The metal layer M1 is interposed between the dielectric layers D1 and D2. The core facing surface 40e is formed by the bottom surface of the metal layer M1. The metal layer M2 is interposed between the dielectric layers D2 and D3. The metal layer M3 is interposed between the dielectric layers D3 and D4. Each of the metal layers M1 to M3 and the dielectric layers D1 to D4 has an end located in the front end face 90a (40a).

Each of the metal layers M1, M2, and M3 is formed of a metal material. The metal materials used to form the metal layers M1, M2, and M3 may all be the same or different from each other. Alternatively, two of them may be the same with the remainder different from the two.

Each of the dielectric layers D1, D2, D3, and D4 is formed of a dielectric material. The dielectric material used to form the dielectric layer D1, the dielectric material used to form the dielectric layer D2, the dielectric material used to form the dielectric layer D3, and the dielectric material used to form the dielectric layer D4 have the same permittivity. The dielectric layers D1, D2, D3, and D4 are preferably formed of the same dielectric material. The dielectric materials used to form the dielectric layers D1, D2, D3, and D4 are preferably higher in Vickers hardness than the metal materials used to form the metal layers M1, M2, and M3.

Each of the metal materials used to form the metal layers M1, M2, and M3 may be one of Au, Ag, Al, and Cu, for example. Each of the dielectric materials used to form the dielectric layers D1, D2, D3, and D4 may be $SiO_2$ or alumina, for example.

Each of the metal layers M1, M2, and M3 preferably has a thickness in the range of 5 to 20 nm, and more preferably in the range of 5 to 10 nm. Each of the dielectric layers D2, D3, and D4 has a thickness in the range of 0.3 to 5 nm, for example.

The near-field light generator according to the present embodiment is configured so that the first metal layer M1 propagates first surface plasmons, the second metal layer M2 propagates second surface plasmons, and the front end face 90a or particularly the front end face 40a generates near-field light based on the first and second surface plasmons. The first and second surface plasmons are excited based on the light propagated through the core 20.

As shown in FIG. 2, the core facing surface 40e faces the evanescent light generating surface 20e with a predetermined distance therebetween. The first dielectric layer D1 (the cladding layer 21) includes an interposition part 21b interposed between the evanescent light generating surface 20e and the first metal layer M1. The interposition part 21b has a thickness in the range of, for example, 10 to 100 nm, preferably in the range of 15 to 50 nm.

As shown in FIG. 1 to FIG. 3, the multilayer structure 90 may further include an adhesion layer 39 interposed between the first dielectric layer D1 (the cladding layer 21) and the plasmon generator 40. The adhesion layer 39 is to prevent the plasmon generator 40 from peeling away from the first dielectric layer D1 (the cladding layer 21). The adhesion layer 39 may be formed of one of Zr, Ti, Cr, Ta, and W, for example.

The adhesion layer 39 has a thickness in the range of 0.3 to 1 nm, for example. The adhesion layer 39 is not an essential component of the multilayer structure 90, and can be dispensed with.

As shown in FIG. 1 and FIG. 4, the plasmon generator 40 may include a portion whose width in the X direction decreases toward the front end face 40a.

Now, the principle of generation of near-field light in the present embodiment and the principle of thermally-assisted magnetic recording using the near-field light will be described in detail. Laser light emitted from a laser diode (not illustrated) enters the core 20. As shown in FIG. 5, the laser light 50 is propagated through the core 20 toward the medium facing surface 60, and reaches the vicinity of the plasmon generator 40. In the core 20, the laser light 50 is totally reflected at the evanescent light generating surface 20e shown in FIG. 2 to generate evanescent light permeating into the interposition part 21b. In the plasmon generator 40, surface plasmons are excited on the core facing surface 40e through coupling with the evanescent light generated from the evanescent light generating surface 20e of the core 20. As a result, surface plasmons are excited on the surface of the first metal layer M1. In the present embodiment, the surface plasmons excited on the surface of the metal layer M1 will be referred to as the first surface plasmons.

The thicknesses of the dielectric layers D2 and D3 are sufficiently smaller than the wavelength of light propagated through the core 20. Consequently, a transfer of energy occurs between the metal layers M1 and M2 which are adjacent to each other with the dielectric layer D2 interposed therebetween, and between the metal layers M2 and M3 which are adjacent to each other with the dielectric layer D3 interposed therebetween, so that surface plasmons are excited also on the surfaces of the metal layers M2 and M3. However, the energy of the surface plasmons excited on the surfaces of the metal layers M2 and M3 is lower than the energy of the surface plasmons excited on the core facing surface 40e. In the present embodiment, the surface plasmons excited on the surface of the metal layer M2 will be referred to as the second surface plasmons.

The surface plasmons excited on the respective surfaces of the metal layers M1, M2 and M3 are propagated to the front end face 90a (40a). As a result, the surface plasmons concentrate at the front end face 90a (40a), and the front end face 90a (40a) generates near-field light based on the surface plasmons.

The near-field light generated from the front end face 90a (40a) is projected toward the recording medium 80, reaches the surface of the recording medium 80 and heats a part of the magnetic recording layer of the recording medium 80. This lowers the coercivity of the part of the magnetic recording layer. In thermally-assisted magnetic recording, the part of the magnetic recording layer with the lowered coercivity is subjected to a write magnetic field produced by the main pole 26 for data writing.

A method of manufacturing the thermally-assisted magnetic recording head according to the present embodiment will now be described. The method of manufacturing the thermally-assisted magnetic recording head includes the steps of forming components of a plurality of thermally-assisted magnetic recording heads, except the substrates 1, on a wafer that includes portions to become the substrates 1 of the plurality of thermally-assisted magnetic recording heads, thereby fabricating a substructure including rows of a plurality pre-head portions, the plurality of pre-head portions becoming individual thermally-assisted magnetic recording heads later; and separating the plurality of pre-head portions from each other by cutting the substructure and forming the medium facing surface 60 for each of the plurality of pre-head portions (this step will be referred to as the step of forming the medium facing surface 60). A plurality of thermally-assisted magnetic recording heads are produced in this manner.

The method of manufacturing the thermally-assisted magnetic recording head according to the present embodiment will now be described in more detail with attention focused on a single thermally-assisted magnetic recording head. The method of manufacturing the thermally-assisted magnetic recording head forms the insulating layer 2, the bottom shield layer 3, and the bottom shield gap film 4 in this order on the substrate 1 first. Next, the MR element 5 and two leads (not illustrated) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

Then, the return pole layer 11 is formed on the nonmagnetic layer 10. Next, an insulating layer (not illustrated) is formed to cover the return pole layer 11. The non-illustrated insulating layer is then polished by, for example, chemical mechanical polishing (hereinafter referred to as CMP), until the return pole layer 11 is exposed. Next, the insulating layer 14 is formed over the return pole layer 11 and the non-illustrated insulating layer. The insulating layer 14 is then selectively etched to form therein two openings for exposing the top surface of the return pole layer 11. In the positions of these two openings, the shield layer 12 and the coupling layer 13 are then formed on the return pole layer 11. Next, the coil 15 is formed on the insulating layer 14.

Next, the insulating layer 16 is formed over the entire top surface of the stack. The insulating layer 16 is then polished by, for example, CMP, until the shield layer 12, the coupling layer 13 and the coil 15 are exposed. Next, although not illustrated, the first layers of the coupling portions 17A and 17B are formed on the coupling layer 13. Then, the cladding layer 18 is formed over the entire top surface of the stack. The cladding layer 18 is then polished by, for example, CMP, until the first layers of the coupling portions 17A and 17B are exposed.

Next, a dielectric layer to become the core 20 is formed over the entire top surface of the stack. The dielectric layer is then etched in part by, for example, reactive ion etching (hereinafter referred to as RIE), and thereby patterned into the core 20. Next, although not illustrated, the second layers of the coupling portions 17A and 17B are formed on the first layers of the coupling portions 17A and 17B.

Next, the cladding layer 19 is formed over the entire top surface of the stack. The cladding layer 19 is then polished by, for example, CMP, until the dielectric layer and the second layers of the coupling portions 17A and 17B are exposed.

Figure 7A:
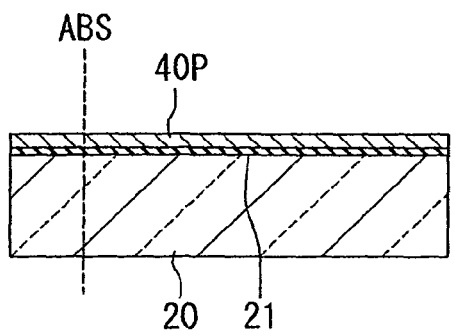
FIG. 7A and FIG. 7B are cross-sectional views showing a step of a method of manufacturing the thermally-assisted magnetic recording head according to the first embodiment of the invention.

Reference is now made to FIG. 7A through FIG. 13B to describe steps to be performed after the polishing of the cladding layer 19 up to the formation of the dielectric layer 28. FIG. 7A through FIG. 13B each show a stack of layers formed in the process of manufacturing the thermally-assisted magnetic recording head. Note that portions located below the core 20 are omitted from FIG. 7A through FIG. 13B. FIG. 7A to FIG. 13A each show a cross section that intersects the front end face 26a of the main pole 26 and that is perpendicular to the medium facing surface 60 and the top surface 1a of the substrate 1. FIG. 7B to FIG. 13B each show a cross section of the stack taken in the position at which the medium facing surface 60 is to be formed. In FIG. 7A to FIG.

13A, the symbol "ABS" indicates the position at which the medium facing surface 60 is to be formed.

Figure 7B:
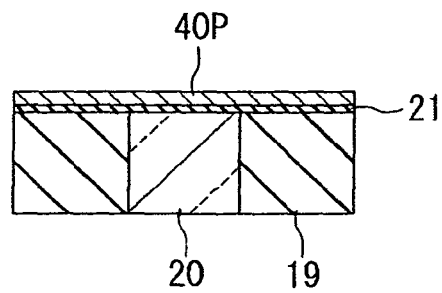

FIG. 7A and FIG. 7B show a step that follows the polishing of the cladding layer 19. In this step, first, the cladding layer 21 is formed over the core 20 and the cladding layer 19. The adhesion layer 39 (not illustrated) is then formed on the cladding layer 21 by sputtering, for example. On the adhesion layer 39, a plurality of films that later become the layers of the plasmon generator 40 are formed in succession by sputtering, for example. A multilayer film 40P composed of the plurality of films is thereby formed.

Figure 8A:
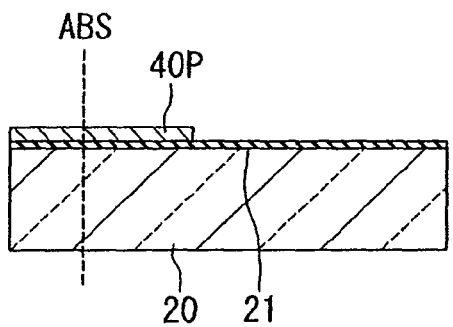
FIG. 8A and FIG. 8B are cross-sectional views showing a step that follows the step shown in FIG. 7A and FIG. 7B.
Figure 8B:
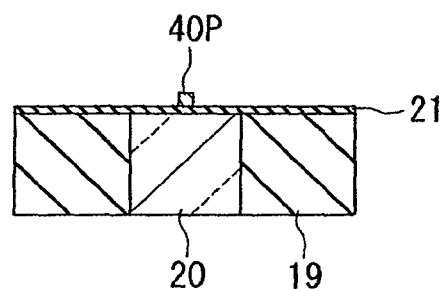

FIG. 8A and FIG. 8B show the next step. In this step, first, an etching mask, not illustrated, is formed on the multilayer film 40P. Using this etching mask, the multilayer film 40P is then patterned by RIE or ion beam etching (hereinafter referred to as IBE), for example. The multilayer film 40P having been patterned includes a portion to become the plasmon generator 40 and a portion to be removed.

Figure 9A:
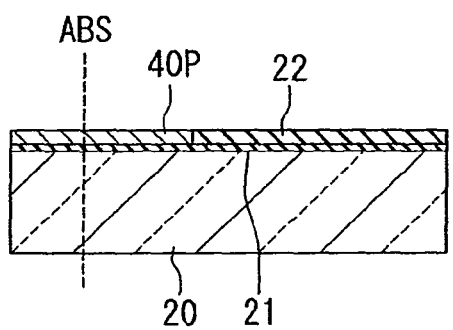
FIG. 9A and FIG. 9B are cross-sectional views showing a step that follows the step shown in FIG. 8A and FIG. 8B.
Figure 9B:
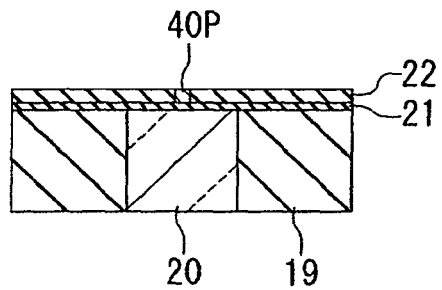

FIG. 9A and FIG. 9B show the next step. In this step, first, the dielectric layer 22 is formed over the entire top surface of the stack. The dielectric layer 22 is then polished by, for example, CMP, until the multilayer film 40P is exposed.

FIG. 10A and FIG. 10B show the next step. In this step, the heat sink 23 is formed to lie astride part of the multilayer film 40P and part of the dielectric layer 22.

FIG. 11A and FIG. 11B show the next step. In this step, first, the dielectric layer 24 is formed to cover the heat sink 23. Then, the dielectric layer 25 is formed to cover the dielectric layer 24.

Figure 12A:
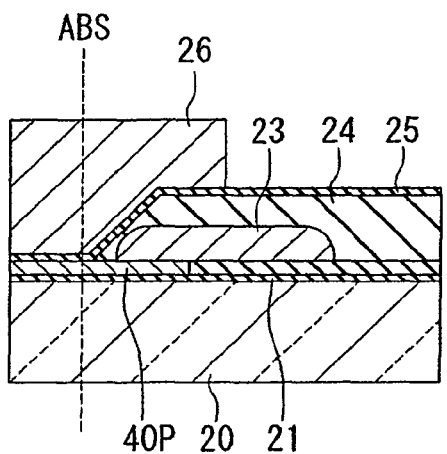
FIG. 12A and FIG. 12B are cross-sectional views showing a step that follows the step shown in FIG. 11A and FIG. 11B.
Figure 12B:
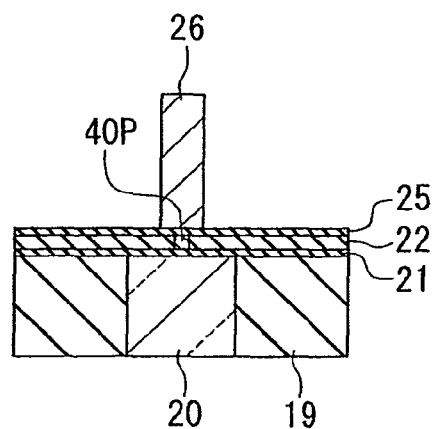

FIG. 12A and FIG. 12B show the next step. In this step, first, the cladding layer 21 and the dielectric layers 22, 24 and 25 are selectively etched to form therein two openings for exposing the respective top surfaces of the second layers of the coupling portions 17A and 17B. Next, the third layers of the coupling portions 17A and 17B are formed on the second layers of the coupling portions 17A and 17B, respectively. Then, the main pole 26 is formed on the dielectric layer 25, and the coupling layer 27 is formed on the third layers of the coupling portions 17A and 17B and the dielectric layer 25.

Figure 13A:
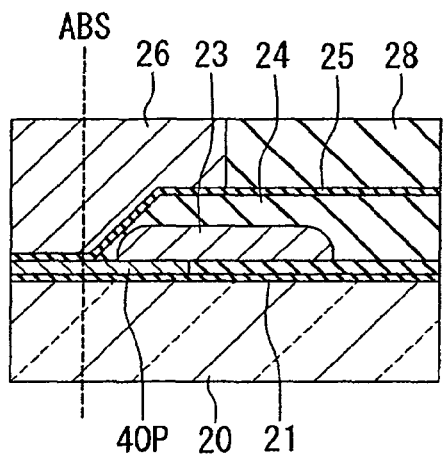
FIG. 13A and FIG. 13B are cross-sectional views showing a step that follows the step shown in FIG. 12A and FIG. 12B.
Figure 13B:
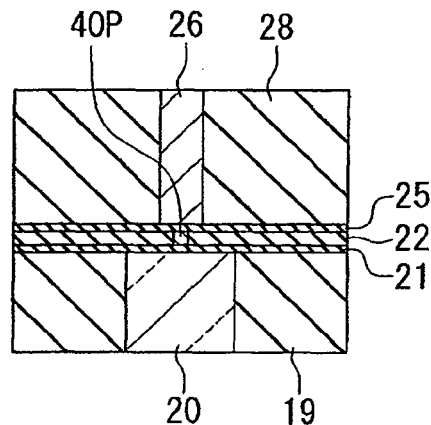

FIG. 13A and FIG. 13B show the next step. In this step, first, the dielectric layer 28 is formed over the entire top surface of the stack. The dielectric layer 28 is then polished by, for example, CMP, until the main pole 26 and the coupling layer 27 are exposed. The top surfaces of the main pole 26, the coupling layer 27 and the dielectric layer 28 are thereby made even with each other.

Now, steps to follow the step of FIG. 13A and FIG. 13B will be described with reference to FIG. 4 and FIG. 5. First, the coil 29 is formed on the dielectric layer 28. The insulating layer 30 is then formed to cover the coil 29. Next, the yoke layer 31 is formed over the main pole 26, the coupling layer 27 and the insulating layer 30. Then, the protective layer 32 is formed to cover the yoke layer 31. Wiring, terminals, and other components are then formed on the top surface of the protective layer 32. When the substructure is completed thus, the step of forming the medium facing surface 60 is performed. In the step of forming the medium facing surface 60, the portion to be removed of the multilayer film 40P is removed and the multilayer film 40P is provided with the front end face 40a, whereby the multilayer film 40P becomes the plasmon generator 40. A protective film for covering the medium facing surface 60 may be formed thereafter. Being provided with the medium facing surface 60, each pre-head portion becomes a thermally-assisted magnetic recording head.

The step of forming the medium facing surface 60 includes the step of polishing the surface that is formed for each pre-head portion by cutting the substructure, and the step of forming a rail on the polished surface for allowing the slider to fly.

In the aforementioned polishing step, the layers exposed in the medium facing surface 60 may be polished in different amounts due to differences between materials used for those layers, and this may cause irregularities on the medium facing surface 60.

Further, in the aforementioned polishing step, polishing residues of the metal materials may grow to cause smears. In order to remove the smears, the step of forming the medium facing surface 60 may include the step of etching the polished surface slightly by, for example, ion beam etching, after the polishing step.

The effects of the near-field light generator and the thermally-assisted magnetic recording head according to the present embodiment will now be described. The near-field light generator according to the present embodiment includes the multilayer structure 90 having the front end face 90a. The multilayer structure 90 includes at least the first dielectric layer D1, the second dielectric layer D2, the third dielectric layer D3, the first metal layer M1, and the second metal layer M2. The first metal layer M1 is interposed between the first dielectric layer D1 and the second dielectric layer D2. The second metal layer M2 is interposed between the second dielectric layer D2 and the third dielectric layer D3. The dielectric material used to form the dielectric layer D1, the dielectric material used to form the dielectric layer D2, and the dielectric material used to form the dielectric layer D3 have the same permittivity.

It is known that the structure in which a thin metal film is sandwiched between two dielectric layers having the same permittivity is able to generate long-range surface plasmons. The long-range surface plasmons are surface plasmons in a mode in which an electric field in the metal film is roughly perpendicular to the direction of propagation of the surface plasmons. The long-range surface plasmons are significantly reduced in loss and able to be propagated over a very long distance. The propagation distance of the long-range surface plasmons increases with decreasing thickness of the metal film. For example, for a metal film having a thickness on the order of 5 to 20 nm, the propagation distance of the long-range surface plasmons can be on the order of 100 μm to several millimeters.

The near-field light generator according to the present embodiment includes at least two structures that are each able to generate the long-range surface plasmons. One of the two structures is such that the first metal layer M1 is sandwiched between the first dielectric layer D1 and the second dielectric layer D2 having the same permittivity, and the other is such that the second metal layer M2 is sandwiched between the second dielectric layer D2 and the third dielectric layer D3 having the same permittivity. Thus, in the present embodiment, the first surface plasmons propagated through the first metal layer M1 and the second surface plasmons propagated through the second metal layer M2 can both be the long-range surface plasmons. Thus, the near-field light generator according to the present embodiment makes it possible to efficiently propagate the first and second surface plasmons to the front end face 90a (40a) while reducing the losses thereof.

To make full use of the advantages of the long-range surface plasmons mentioned above, each of the first and second metal layers M1 and M2 preferably has a thickness of 20 nm or smaller. On the other hand, an attempt to make the thickness of each of the first and second metal layers M1 and M2 smaller than 5 nm would make it difficult to form the first and second metal layers M1 and M2 in a uniform thickness. Thus, the thickness of each of the first and second metal layers M1 and M2 is preferably within the range of 5 to 20 nm, and more preferably within the range of 5 to 10 nm.

Suppose that the above-described structure capable of generating the long-range surface plasmons is simply applied to a thermally-assisted magnetic recording head to use the aforementioned metal film as the plasmon generator. In this case, during the operation of the thermally-assisted magnetic recording head, heat would concentrate into the plasmon generator to cause a significant increase in the temperature of the plasmon generator. This would raise the problem that the plasmon generator is deformed or damaged, or the front end face of the plasmon generator is significantly recessed relative to the other parts of the medium facing surface 60.

To address this problem, the near-field light generator according to the present embodiment includes at least two metal layers M1 and M2 which are separated from each other by the dielectric layer D2. The present embodiment thus makes it possible to prevent heat from concentrating into one metal layer, thereby suppressing temperature increases of the metal layers M1 and M2. This prevents the metal layers M1 and M2 from being deformed or damaged, and prevents the respective ends of the metal layers M1 and M2 from being significantly recessed relative to the other parts of the medium facing surface 60. Consequently, according to the present embodiment, it is possible to prevent degradation in the heating performance of the near-field light generator. These effects become more noticeable as the number of the metal layers increases.

In the present embodiment, particularly when the dielectric materials used to form the dielectric layers D1, D2, D3 and D4 are higher in Vickers hardness than the metal materials used to form the metal layers M1, M2 and M3, the dielectric layers D1, D2, D3 and D4 serve to prevent the metal layers M1, M2 and M3 from being deformed. This makes it possible to prevent the metal layers M1, M2 and M3 from being deformed or damaged, and the respective ends of the metal layers M1, M2 and M3 from being significantly recessed relative to the other parts of the medium facing surface 60 in the step of forming the medium facing surface 60 or due to temperature changes of the metal layers M1, M2 and M3. This also serves to prevent degradation in the heating performance of the near-field light generator.

As can be seen from the foregoing, according to the present embodiment, it is possible to provide a near-field light generator of high reliability that is capable of propagating surface plasmons to the front end face 90a (40a) efficiently, and to provide a thermally-assisted magnetic recording head having such a near-field light generator.

Second Embodiment

Figure 18:
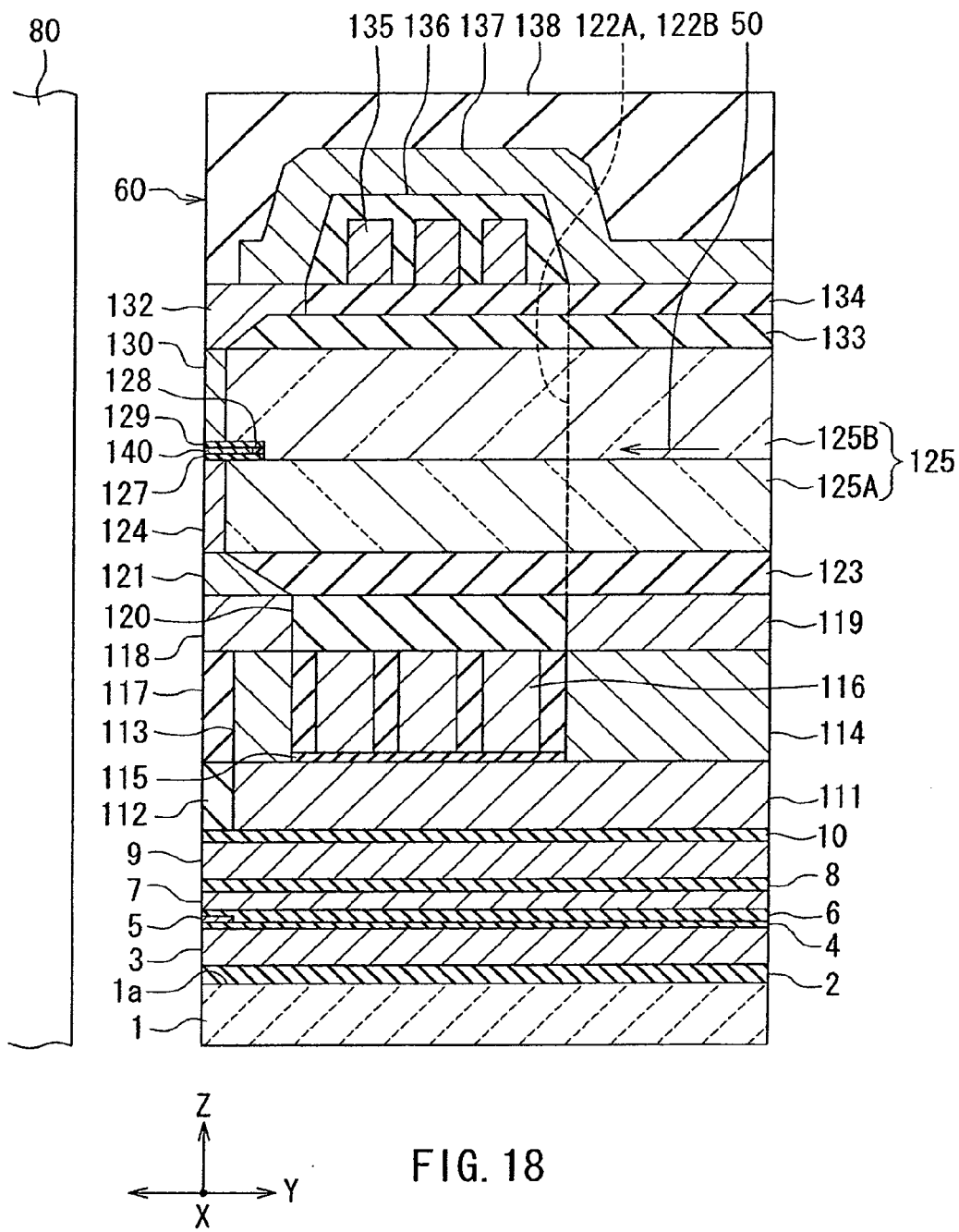
FIG. 18 is a cross-sectional view showing the configuration of a thermally-assisted magnetic recording head according to the second embodiment of the invention.
Figure 19:
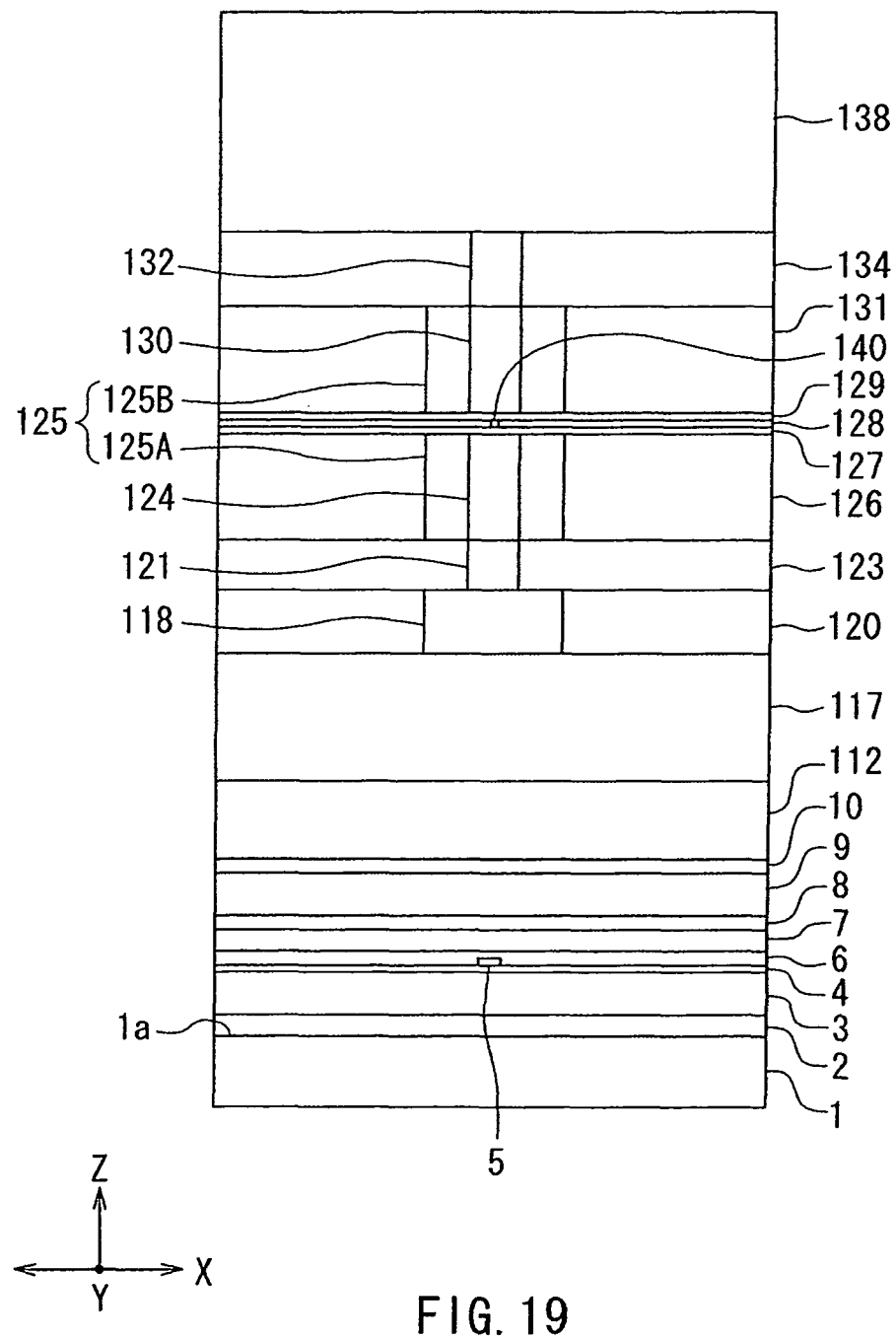
FIG. 19 is a front view showing the medium facing surface of the thermally-assisted magnetic recording head according to the second embodiment of the invention.

A near-field light generator and a thermally-assisted magnetic recording head according to a second embodiment of the invention will now be described. The thermally-assisted magnetic recording head according to the present embodiment includes the near-field light generator according to the present embodiment. First, reference is made to FIG. 18 and FIG. 19 to describe the configuration of the thermally-assisted magnetic recording head according to the present embodiment. FIG. 18 is a cross-sectional view showing the configuration of the thermally-assisted magnetic recording head according to the present embodiment. FIG. 19 is a front view showing the medium facing surface of the thermally-assisted magnetic recording head according to the present embodiment.

In the thermally-assisted magnetic recording head according to the present embodiment, the parts from the substrate 1 to the nonmagnetic layer 10 are the same as those in the first embodiment. Now, a description will be given of how the thermally-assisted magnetic recording head according to the present embodiment differs from the first embodiment.

The thermally-assisted magnetic recording head includes a return pole layer 111 formed of a magnetic material and disposed on the nonmagnetic layer 10, and an insulating layer 112 disposed on the nonmagnetic layer 10 and surrounding the return pole layer 111. The return pole layer 111 has an end face facing toward the medium facing surface 60 and located at a distance from the medium facing surface 60. The insulating layer 112 is formed of alumina, for example.

The thermally-assisted magnetic recording head further includes: a coupling layer 113 located near the medium facing surface 60 and lying on a part of the return pole layer 111; a coupling layer 114 located apart from the medium facing surface 60 and lying on another part of the return pole layer 111; an insulating layer 115 lying on the remainder of the return pole layer 111 and on the insulating layer 112; and a coil 116 lying on the insulating layer 115. The coupling layers 113 and 114 are each formed of a magnetic material. The coupling layer 113 has an end face facing toward the medium facing surface 60 and located at a distance from the medium facing surface 60. The coil 116 is planar spiral-shaped and wound around the coupling layer 114. The coil 116 is formed of a conductive material such as copper. The insulating layer 115 is formed of alumina, for example.

The thermally-assisted magnetic recording head further includes: an insulating layer 117 disposed around the coupling layers 113 and 114 and the coil 116 and in the space between adjacent turns of the coil 116; a coupling layer 118 disposed over the coupling layer 113 and the insulating layer 117; a coupling layer 119 disposed on the coupling layer 114; and an insulating layer 120 disposed over the coil 116 and the insulating layer 117 and surrounding the coupling layers 118 and 119. The coupling layers 118 and 119 are each formed of a magnetic material. The coupling layer 118 has an end face located in the medium facing surface 60. The insulating layers 117 and 120 are formed of alumina, for example.

The thermally-assisted magnetic recording head further includes a coupling layer 121 and a shield layer 124 stacked in this order on the coupling layer 118, and two coupling portions 122A and 122B disposed on the coupling layer 119. The coupling layer 121, the coupling portions 122A and 122B, and the shield layer 124 are each formed of a magnetic material. Each of the coupling layer 121 and the shield layer 124 has a front end face located in the medium facing surface 60 and a rear end face opposite to the front end face. The front end face of each of the coupling layer 121 and the shield layer 124 has a rectangular shape, for example. The distance from the medium facing surface 60 to an arbitrary point on the rear end face of the coupling layer 121 decreases with increasing distance from the arbitrary point to the top surface 1a of the substrate 1. The rear end face of the shield layer 124 is parallel to the medium facing surface 60. Each of the coupling portions 122A and 122B has a first layer located on the coupling layer 119, and a second, a third, and a fourth layer stacked in this order on the first layer. The first layer of the coupling portion 122A and the first layer of the coupling portion 122B are disposed to be aligned in the track width direction (the X direction).

The thermally-assisted magnetic recording head further includes a main pole 130 disposed above the shield layer 124, and a plasmon generator 140 disposed between the shield layer 124 and the main pole 130. The main pole 130 has a front end face located in the medium facing surface 60 and a rear end face opposite to the front end face. The front end face of the main pole 130 has a rectangular shape, for example. The rear end face of the main pole 130 is parallel to the medium facing surface 60.

The plasmon generator 140 is configured to excite surface plasmons on the principle to be described later. The plasmon generator 140 will be described in detail later.

The thermally-assisted magnetic recording head further includes a waveguide and dielectric layers 127, 128, and 129. The waveguide includes a core 125 through which light is propagated, and a cladding provided around the core 125. The core 125 includes a first layer 125A and a second layer 125B. The cladding includes cladding layers 123, 126, 131, and 133. The cladding layer 123 is disposed over the coupling layer 119 and the insulating layer 120 and surrounds the coupling layer 121. The first layer 125A of the core 125 is disposed on the cladding layer 123 such that the shield layer 124 is interposed between the first layer 125A and the medium facing surface 60. The cladding layer 126 is disposed on the cladding layer 123 and surrounds the first layer 125A. The top surfaces of the shield layer 124, the first layer 125A and the cladding layer 126 are even with each other.

The dielectric layer 127 is disposed over the top surface of the shield layer 124 and portions of the top surfaces of the first layer 125A and the cladding layer 126. The plasmon generator 140 is disposed on the dielectric layer 127.

The dielectric layer 128 is disposed on the dielectric layer 127 and surrounds the plasmon generator 140. The dielectric layer 129 is disposed over the plasmon generator 140 and the dielectric layer 128. The main pole 130 is disposed on the dielectric layer 129. The second layer 125B of the core 125 is disposed on the first layer 125A and the dielectric layer 129 such that the main pole 130 is interposed between the second layer 125B and the medium facing surface 60.

The cladding layer 131 is disposed over the cladding layer 126 and the dielectric layer 129 and surrounds the second layer 125B. The cladding layer 133 is disposed over the second layer 125B and the cladding layer 131.

The first layers of the coupling portions 122A and 122B are embedded in the cladding layer 123. The second layers of the coupling portions 122A and 122B are embedded in the cladding layer 126. The third layers of the coupling portions 122A and 122B are embedded in the cladding layer 131. The second layer of the coupling portion 122A and the second layer of the coupling portion 122B are located on opposite sides of the first layer 125A in the track width direction (the X direction), each being at a distance from the first layer 125A. The third layer of the coupling portion 122A and the third layer of the coupling portion 122B are located on opposite sides of the second layer 125B in the track width direction, each being at a distance from the second layer 125B.

The core 125 is formed of a dielectric material that transmits laser light to be used for generating near-field light. The laser light emitted from a laser diode (not illustrated) enters the core 125 and is propagated through the core 125. The cladding layers 123, 126, 131 and 133 and the dielectric layers 127 to 129 are each formed of a dielectric material that has a refractive index lower than that of the core 125. For example, the core 125 may be formed of tantalum oxide such as $Ta_2O_5$ or silicon oxynitride (SiON), whereas the cladding layers 123, 126, 131 and 133 and the dielectric layers 127 to 129 may be formed of silicon dioxide ($SiO_2$) or alumina. The shape of the core 125 will be described in detail later.

The thermally-assisted magnetic recording head further includes a coupling layer 132 formed of a magnetic material and disposed on the main pole 130 and the cladding layer 133.

The coupling layer 132 has a front end face located in the medium facing surface 60, a rear end face opposite to the front end face, a bottom surface, and first and second connecting surfaces connecting the rear end face and the bottom surface to each other. The front end face of the coupling layer 132 has a rectangular shape, for example. In the coupling layer 132, one end of the first connecting surface is connected to the bottom surface, the other end of the first connecting surface is connected to one end of the second connecting surface, and the other end of the second connecting surface is connected to the rear end face. The distance from the medium facing surface 60 to an arbitrary point on the first connecting surface increases with increasing distance from the arbitrary point to the top surface 1a of the substrate 1. The bottom surface and the second connecting surface extend substantially in the direction perpendicular to the medium facing surface 60 (the Y direction). The rear end face is parallel to the medium facing surface 60.

The thermally-assisted magnetic recording head further includes a dielectric layer 134 disposed on the cladding layer 133 and surrounding the coupling layer 132. The fourth layers of the coupling portions 122A and 122B are embedded in the cladding layer 133 and the dielectric layer 134. The top surfaces of the coupling layer 132, the fourth layers of the coupling portions 122A and 122B, and the dielectric layer 134 are even with each other. The dielectric layer 134 is formed of the same material as the cladding layers 123, 126, 131 and 133.

The thermally-assisted magnetic recording head further includes a coil 135 disposed on the dielectric layer 134, an insulating layer 136 disposed to cover the coil 135, and a yoke layer 137 formed of a magnetic material and disposed over the coupling layer 132, the coupling portions 122A and 122B, the dielectric layer 134 and the insulating layer 136. The yoke layer 137 magnetically couples the coupling layer 132 to the coupling portions 122A and 122B. The coil 135 is planar spiral-shaped and wound around portions of the yoke layer 137 lying on the coupling portions 122A and 122B. The coil 135 is formed of a conductive material such as copper. The insulating layer 136 is formed of alumina, for example.

The thermally-assisted magnetic recording head further includes a protective layer 138 disposed to cover the yoke layer 137. The protective layer 138 is formed of alumina, for example.

The parts from the return pole layer 111 to the yoke layer 137 constitute a write head section. The coils 116 and 135 produce magnetic fields corresponding to data to be written on the recording medium. The shield layer 124, the coupling layers 121, 118 and 113, the return pole layer 111, the coupling layers 114 and 119, the coupling portions 122A and 122B, the yoke layer 137, the coupling layer 132, and the main pole 130 form a magnetic path for passing magnetic fluxes corresponding to the magnetic fields produced by the coils 116 and 135. The coils 116 and 135 are connected in series or in parallel so that the magnetic flux corresponding to the magnetic field produced by the coil 116 and the magnetic flux corresponding to the magnetic field produced by the coil 135 flow in the same direction through the aforementioned magnetic path. The main pole 130 produces a write magnetic field for writing data on the recording medium by means of a perpendicular magnetic recording system based on the magnetic fluxes passing through the aforementioned magnetic path.

Figure 14:
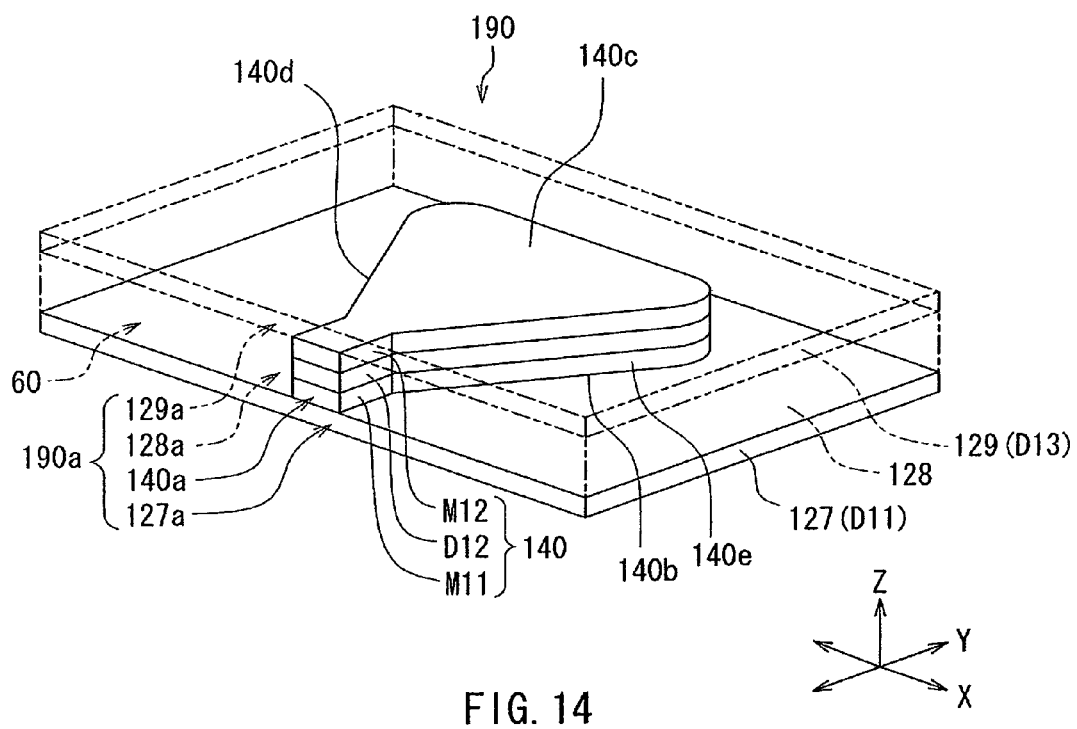
FIG. 14 is a perspective view showing a multilayer structure of a near-field light generator according to a second embodiment of the invention.
Figure 15:
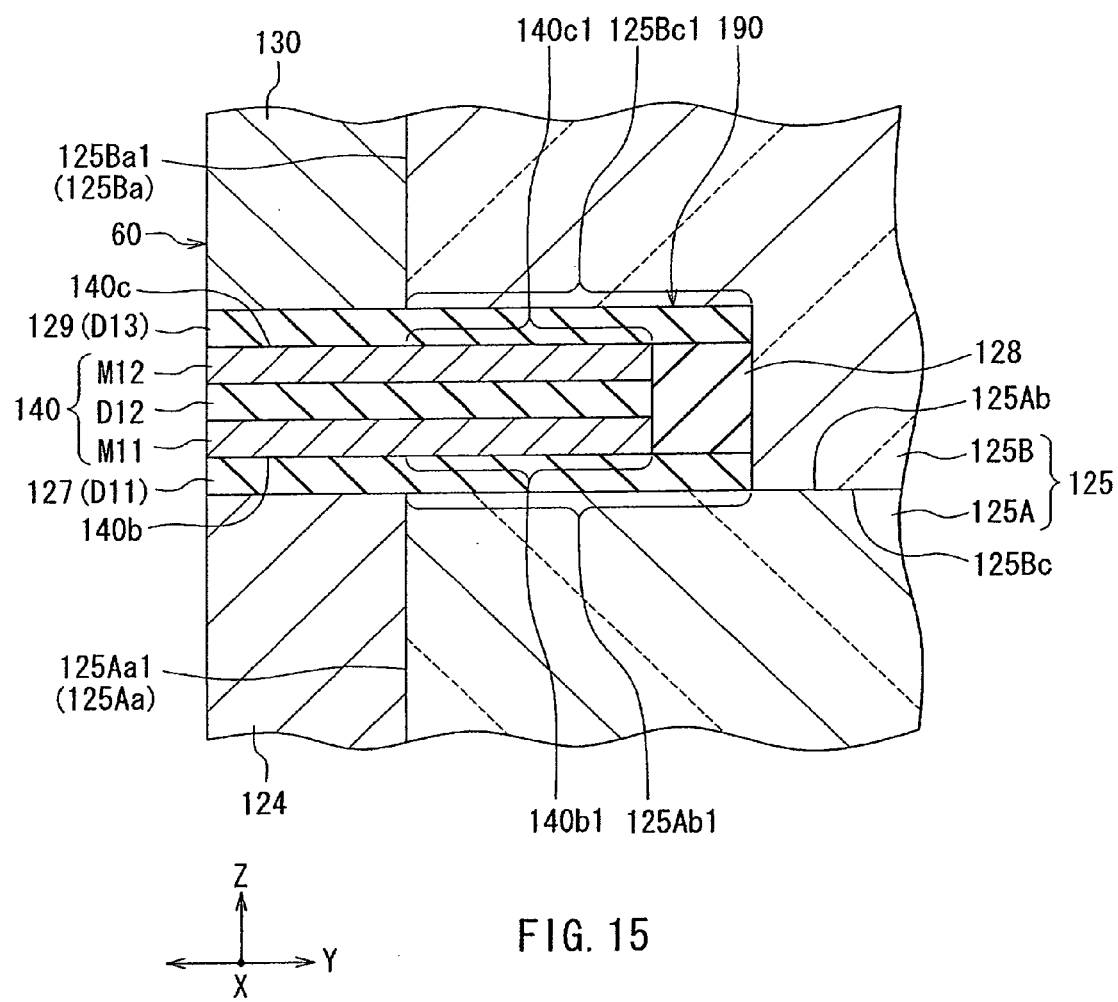
FIG. 15 is a cross-sectional view showing the main part of the near-field light generator according to the second embodiment of the invention.
Figure 16:
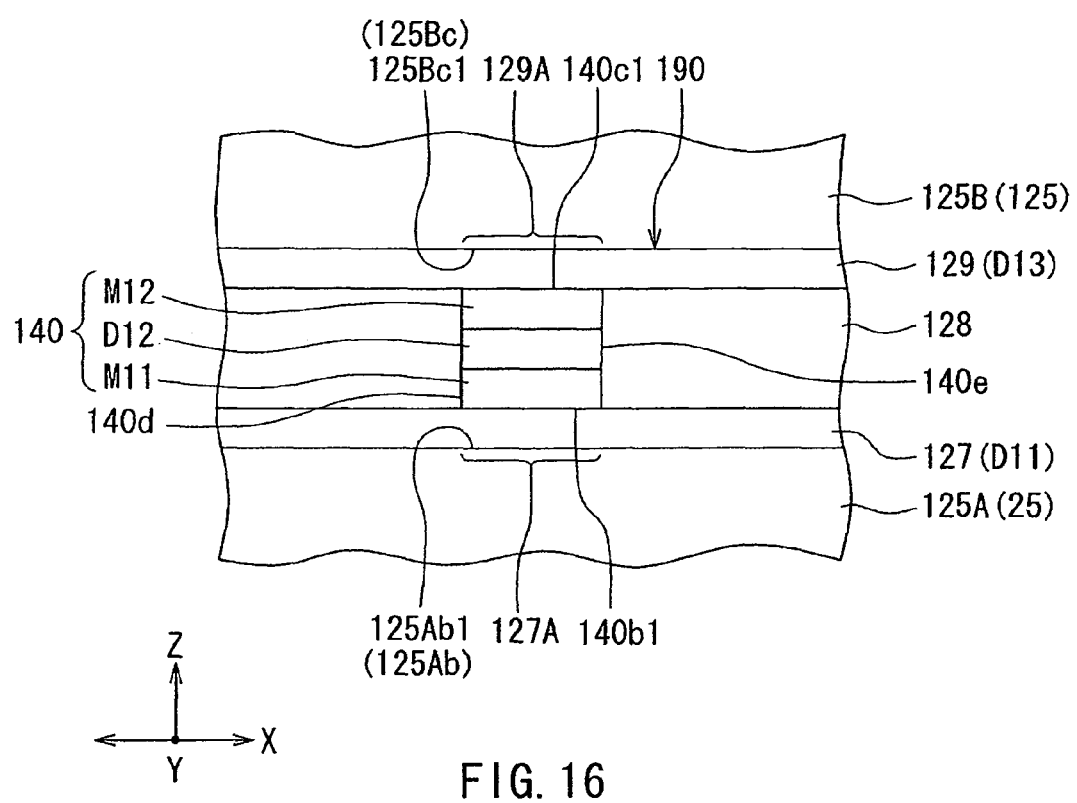
FIG. 16 is a front view showing the main part of the near-field light generator according to the second embodiment of the invention.
Figure 17:
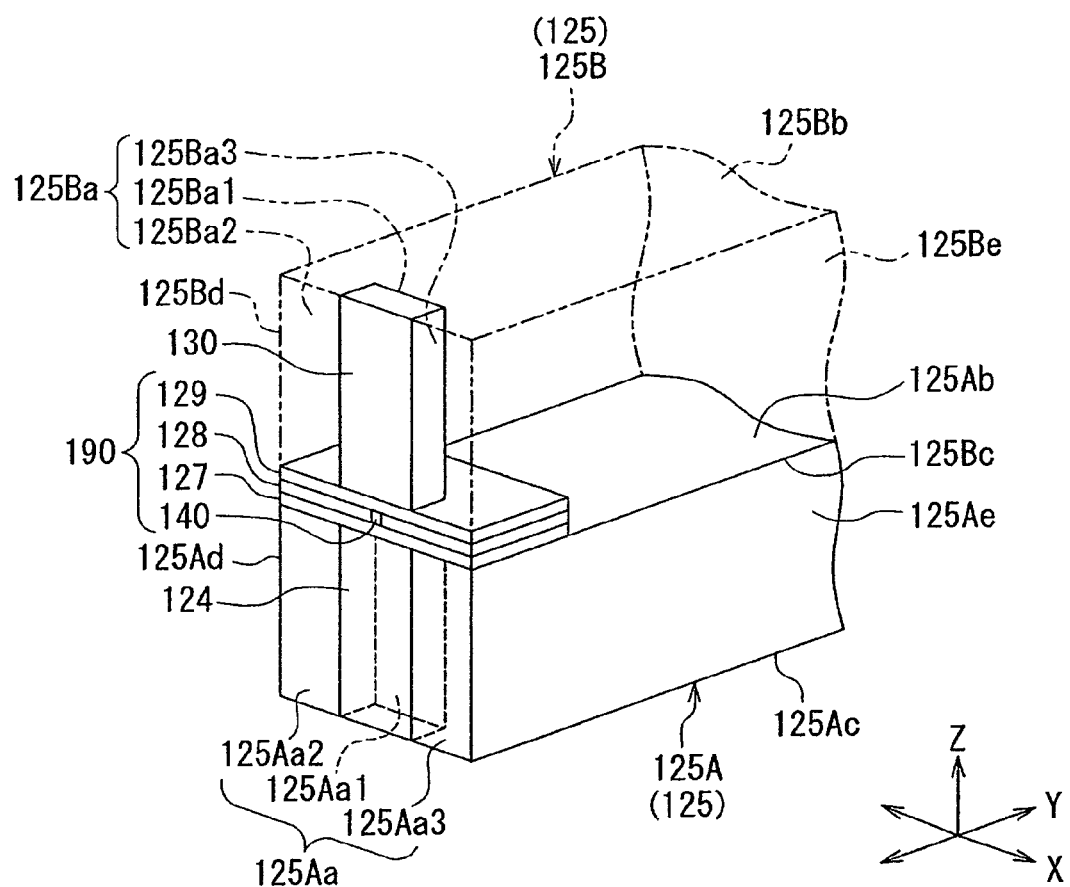
FIG. 17 is a perspective view showing the main part of the near-field light generator according to the second embodiment of the invention.

The near-field light generator according to the present embodiment will now be described in detail with reference to FIG. 14 to FIG. 17. FIG. 14 is a perspective view showing the multilayer structure of the near-field light generator according to the present embodiment. FIG. 15 is a cross-sectional view showing the main part of the near-field light generator according to the present embodiment. FIG. 16 is a front view showing the main part of the near-field light generator according to the present embodiment. FIG. 17 is a perspective view showing the main part of the near-field light generator according to the present embodiment.

As shown in FIG. 17, the near-field light generator according to the present embodiment includes a multilayer structure 190 and the core 125. The multilayer structure 190 includes the dielectric layers 127, 128 and 129 and the plasmon generator 140. As shown in FIG. 14, the multilayer structure 190 has a front end face 190a located in the medium facing surface 60.

As shown in FIG. 17, the first layer 125A of the core 125 has an end face 125Aa closer to the medium facing surface 60, a top surface 125Ab, a bottom surface 125Ac, and two side surfaces 125Ad and 125Ae. The end face 125Aa includes a first portion 125Aa1, a second portion 125Aa2, and a third portion 125Aa3. The second portion 125Aa2 and the third portion 125Aa3 are located on opposite sides of the first portion 125Aa1 in the track width direction (the X direction). The first portion 125Aa1 is located apart from the medium facing surface 60. The second and third portions 125Aa2 and 125Aa3 are located in the medium facing surface 60. The shield layer 124 is located between the first portion 125Aa1 and the medium facing surface 60. Note that the shield layer 124 may or may not be in contact with the first layer 125A. In the latter case, part of the cladding may be interposed between the shield layer 124 and the first layer 125A.

The second layer 125B of the core 125 has an end face 125Ba closer to the medium facing surface 60, a top surface 125Bb, a bottom surface 125Bc, and two side surfaces 125Bd and 125Be. The end face 125Ba includes a first portion 125Ba1, a second portion 125Ba2, and a third portion 125Ba3. The second portion 125Ba2 and the third portion 125Ba3 are located on opposite sides of the first portion 125Ba1 in the track width direction (the X direction). The first portion 125Ba1 is located apart from the medium facing surface 60. The second and third portions 125Ba2 and 125Ba3 are located in the medium facing surface 60. The main pole 130 is located between the first portion 125Ba1 and the medium facing surface 60. Note that the main pole 130 may or may not be in contact with the second layer 125B. In the latter case, part of the cladding may be interposed between the main pole 130 and the second layer 125B.

As shown in FIG. 15, the bottom surface 125Bc of the second layer 125B includes a front portion and a rear portion, the front portion being located closer to the medium facing surface 60. The rear portion is located apart from the medium facing surface 60 and in contact with the top surface 125Ab of the first layer 125A. The front portion is located farther from the top surface 125Ab than is the rear portion by a distance created by the thicknesses of the dielectric layers 127 and 129 and the plasmon generator 140.

The top surface 125Ab of the first layer 125A includes a first evanescent light generating surface 125Ab1 that generates first evanescent light based on the light propagated through the core 125. The bottom surface 125Bc of the second layer 125B includes a second evanescent light generating surface 125Bc1 that generates second evanescent light based on the light propagated through the core 125. The first evanescent light generating surface 125Ab1 and the second evanescent light generating surface 125Bc1 are opposed to each other with a predetermined distance therebetween. The multilayer structure 190 is interposed between the first evanescent light generating surface 125Ab1 and the second evanescent light generating surface 125Bc1. Since the first layer 125A and the second layer 125B are portions of the core 125, the core 125 can be said to include the first and second evanescent light generating surfaces 125Ab1 and 125Bc1.

As shown in FIG. 14, the plasmon generator 140 has an outer surface. The outer surface includes a front end face 140a located in the medium facing surface 60, a bottom surface 140b, a top surface 140c, first and second side surfaces 140d and 140e, and a rear end face 140f. As shown in FIG. 15, the bottom surface 140b includes a first plasmon exciting part 140b1 that is opposed to the first evanescent light generating surface 125Ab1 with a predetermined distance therebetween. The top surface 140c includes a second plasmon exciting part 140c1 that is opposed to the second evanescent light generating surface 125Bc1 with a predetermined distance therebetween. As shown in FIG. 14, the plasmon generator 140 may include a portion whose width in the X direction decreases toward the front end face 140a.

The dielectric layers 127, 128, and 129 have their respective ends 127a, 128a, and 129a located in the medium facing surface 60. The front end face 190a of the multilayer structure 190 is composed of the front end face 140a of the plasmon generator 140 and the ends 127a, 128a, and 129a of the dielectric layers 127, 128, and 129.

The dielectric layer 127 corresponds to the first dielectric layer of the present invention. Hereinafter, the dielectric layer 127 will also be referred to as the first dielectric layer D11. The dielectric layer 129 corresponds to the third dielectric layer of the present invention. Hereinafter, the dielectric layer 129 will also be referred to as the third dielectric layer D13.

As shown in FIG. 14 to FIG. 16, the plasmon generator 140 includes a first metal layer M11, a second dielectric layer D12, and a second metal layer M12. The first metal layer M11 is interposed between the first dielectric layer D11 (the dielectric layer 127) and the second dielectric layer D12. The second metal layer M12 is interposed between the second dielectric layer D12 and the third dielectric layer D13 (the dielectric layer 129). Each of the metal layers M11 and M12 and the dielectric layer D12 has an end located in the front end face 190a (140a).

Each of the metal layers M11 and M12 is formed of a metal material. The metal materials used to form the metal layers M11 and M12 may be the same or different.

Each of the dielectric layers D11, D12, and D13 is formed of a dielectric material. The dielectric material used to form the dielectric layer D11, the dielectric material used to form the dielectric layer D12, and the dielectric material used to form the dielectric layer D13 have the same permittivity. The dielectric layers D11, D12, and D13 are preferably formed of the same dielectric material. The dielectric materials used to form the dielectric layers D11, D12, and D13 are preferably higher in Vickers hardness than the metal materials used to form the metal layers M11 and M12.

Each of the metal materials used to form the metal layers M11 and M12 may be one of Au, Ag, Al, and Cu, for example. Each of the dielectric materials used to form the dielectric layers D11, D12, and D13 may be $SiO_2$ or alumina, for example.

Each of the metal layers M11 and M12 preferably has a thickness in the range of 5 to 20 nm, and more preferably in the range of 5 to 10 nm. The dielectric layer D12 has a thickness in the range of 5 to 20 nm, for example.

As shown in FIG. 16, the first dielectric layer D11 (the dielectric layer 127) includes a first interposition part 127A interposed between the first evanescent light generating surface 125Ab1 and the first metal layer M11. The third dielectric layer D13 (the dielectric layer 129) includes a second interposition part 129A interposed between the second evanescent light generating surface 125Bc1 and the second metal layer M12.

The near-field light generator according to the present embodiment is configured so that the first metal layer M11 propagates first surface plasmons, the second metal layer M12 propagates second surface plasmons, and the front end face 190a or particularly the front end face 140a generates near-field light based on the first and second surface plasmons. The first and second surface plasmons are excited based on the light propagated through the core 125.

Now, the principle of generation of near-field light in the present embodiment will be described in detail. Laser light emitted from a laser diode (not illustrated) enters the core 125. As shown in FIG. 18, the laser light 50 is propagated through the core 125 toward the medium facing surface 60, and reaches the vicinity of the plasmon generator 140. The first and second evanescent light generating surfaces 125Ab1 and 125Bc1 of the core 125 each generate evanescent light based on the laser light 50 propagated through the core 125. More specifically, when the laser light 50 is totally reflected at the first evanescent light generating surface 125Ab1, the first evanescent light generating surface 125Ab1 generates first evanescent light permeating into the first interposition part 127A. When the laser light 50 is totally reflected at the second evanescent light generating surface 125Bc1, the second evanescent light generating surface 125Bc1 generates second evanescent light permeating into the second interposition part 129A. In the plasmon generator 140, the first surface plasmons are excited on the first plasmon exciting part 140b1 through coupling with the first evanescent light, and the second surface plasmons are excited on the second plasmon exciting part 140c1 through coupling with the second evanescent light. The first metal layer M11 propagates the first surface plasmons. The second metal layer M12 propagates the second surface plasmons. The first and second surface plasmons are propagated to the front end face 190a (140a), and the front end face 190a (140a) generates near-field light based on the first and second surface plasmons.

A method of manufacturing the thermally-assisted magnetic recording head according to the present embodiment will now be described. In the method of manufacturing the thermally-assisted magnetic recording head according to the present embodiment, the parts from the insulating layer 2 to the coupling layer 121 and the first layers of the coupling portions 122A and 122B are first formed on the top surface 1a of the substrate 1 in due order of succession. Next, the cladding layer 123 is formed to cover the coupling layer 121 and the first layers of the coupling portions 122A and 122B. The cladding layer 123 is then polished by, for example, CMP, until the coupling layer 121 and the first layers of the coupling portions 122A and 122B are exposed.

Then, the shield layer 124 is formed on the coupling layer 121, the first layer 125A of the core 125 is formed on the cladding layer 123, and the second layers of the coupling portions 122A and 122B are formed on the first layers thereof. Next, the cladding layer 126 is formed to cover the shield layer 124, the first layer 125A, and the second layers of the coupling portions 122A and 122B. The cladding layer 126 is then polished by, for example, CMP, until the shield layer 124, the first layer 125A, and the second layers of the coupling portions 122A and 122B are exposed.

Next, the dielectric layer 127 is formed on the top surface of the stack. A plurality of films that later become the layers of the plasmon generator 140 are then formed on the dielectric layer 127 to thereby produce a multilayer film composed of those plurality of films. An etching mask, not illustrated, is then formed on the multilayer film. Using this etching mask, the multilayer film is then patterned by RIE or IBE, for example. The multilayer film having been patterned includes a portion to become the plasmon generator 140 and a portion to be removed. Next, the dielectric layer 128 is formed and the top surfaces of the multilayer film and the dielectric layer 128 are made even with each other by CMP, for example. The dielectric layer 129 is then formed on the multilayer film and the dielectric layer 128.

Next, the main pole 130 is formed on the dielectric layer 129, the second layer 125B is formed on the dielectric layer 129 and the first layer 125A, and the third layers of the coupling portions 122A and 122B are formed on the second layers thereof. Then, the cladding layer 131 is formed to cover the main pole 130, the second layer 125B, and the third layers of the coupling portions 122A and 122B. The cladding layer 131 is then polished by, for example, CMP, until the main pole 130, the second layer 125B, and the third layers of the coupling portions 122A and 122B are exposed.

Next, a dielectric layer that later becomes the cladding layer 133 is formed over the entire top surface of the stack. The dielectric layer is then selectively etched to form therein an opening for exposing part of the top surface of the stack in the vicinity of the position where the medium facing surface 60 is to be formed, and two openings for exposing the third layers of the coupling portions 122A and 122B. This makes the dielectric layer into the cladding layer 133.

Next, the parts from the coupling layer 132, the fourth layers of the coupling portions 122A and 122B and the dielectric layer 134 to the protective layer 138 are formed in due order of succession. Wiring, terminals, and other components are then formed on the top surface of the protective layer 138. When the substructure is completed thus, the step of forming the medium facing surface 60 is performed. In the step of forming the medium facing surface 60, the portion to be removed of the multilayer film is removed and the multilayer film is provided with the front end face 140a, whereby the multilayer film becomes the plasmon generator 140. A protective film for covering the medium facing surface 60 may be formed thereafter. Being provided with the medium facing surface 60, each pre-head portion becomes a thermally-assisted magnetic recording head.

The effects of the near-field light generator and the thermally-assisted magnetic recording head according to the present embodiment will now be described. The near-field light generator according to the present embodiment includes two structures that are each capable of generating the long-range surface plasmons. One of the two structures is such that the first metal layer M11 is sandwiched between the first dielectric layer D11 and the second dielectric layer D12 having the same permittivity, and the other is such that the second metal layer M12 is sandwiched between the second dielectric layer D12 and the third dielectric layer D13 having the same permittivity. Thus, in the present embodiment, the first surface plasmons propagated through the first metal layer M11 and the second surface plasmons propagated through the second metal layer M12 can both be the long-range surface plasmons. Thus, the near-field light generator according to the present embodiment makes it possible to efficiently propagate the first and second surface plasmons to the front end face 190a (140a) while reducing the losses thereof.

Further, in the near-field light generator according to the present embodiment, the first surface plasmons excited on the first plasmon exciting part 140b1, which is part of the surface of the first metal layer M11, are directly propagated through the surface of the first metal layer M11. The second surface plasmons excited on the second plasmon exciting part 140c1, which is part of the surface of the second metal layer M12, are directly propagated through the surface of the second metal layer M12. According to the present embodiment, this feature also contributes to the reduction of loss of the first and second surface plasmons.

The remainder of configuration, function and effects of the present embodiment are similar to those of the first embodiment.

The present invention is not limited to the foregoing embodiments, and various modifications may be made thereto. For example, as far as the requirements of the appended claims are met, the shape of the plasmon generator and the locations of the plasmon generator, the core, and the main pole can be chosen as desired, without being limited to the examples illustrated in the foregoing embodiments. For example, the core may be located above the plasmon generator. In this case, the bottom surface of the core serves as the evanescent light generating surface, and the top surface of the plasmon generator serves as the core facing surface.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A near-field light generator comprising a multilayer structure having a front end face, and a core through which light is propagated, wherein
   the multilayer structure includes a first dielectric layer, a second dielectric layer, a third dielectric layer, a first metal layer, and a second metal layer,
   the first metal layer is interposed between the first dielectric layer and the second dielectric layer,
   the second metal layer is interposed between the second dielectric layer and the third dielectric layer,
   each of the first to third dielectric layers and the first and second metal layers has an end located in the front end face,
   each of the first and second metal layers is formed of a metal material,
   each of the first to third dielectric layers is formed of a dielectric material,
   the dielectric material used to form the first dielectric layer, the dielectric material used to form the second dielectric layer, and the dielectric material used to form the third dielectric layer have the same permittivity,
   the near-field light generator is configured so that the first metal layer propagates a first surface plasmon, the second metal layer propagates a second surface plasmon, and the front end face generates near-field light based on the first and second surface plasmons,
   the core has an evanescent light generating surface that generates evanescent light based on the light propagated through the core,
   the first dielectric layer includes an interposition part interposed between the evanescent light generating surface and the first metal layer, and
   the first and second surface plasmons are excited based on the evanescent light generated from the evanescent light generating surface.

2. A near-field light generator comprising a multilayer structure having a front end face, and a core through which light is propagated, wherein
   the multilayer structure includes a first dielectric, layer, a second dielectric layer, a third dielectric layer, a first metal layer, and a second metal layer,
   the first metal layer is interposed between the first dielectric layer and the second dielectric layer,
   the second metal layer is interposed between the second dielectric layer and the third dielectric layer,
   each of the first to third dielectric layers and the first and second metal layers has an end located in the front end face,
   each of the first and second metal layers is formed of a metal material,
   each of the first to third dielectric layers is formed of a dielectric material,
   the dielectric material used to form the first dielectric layer, the dielectric material used to form the second dielectric layer, and the dielectric material used to form the third dielectric layer have the same permittivity,
   the near-field light generator is configured so that the first metal layer propagates a first surface plasmon, the second metal layer propagates a second surface plasmon, and the front end face generates near-field light based on the first and second surface plasmons,
   the first and second surface plasmons are excited based on the light propagated through the core,
   the core has a first evanescent light generating surface and a second evanescent light generating surface opposed to each other with a predetermined distance therebetween,
   the first evanescent light generating surface generates first evanescent light based on the light propagated through the core,
   the second evanescent light generating surface generates second evanescent light based on the light propagated through the core, and
   the multilayer structure is interposed between the first evanescent light generating surface and the second evanescent light generating surface.

3. The near-field light generator according to claim 2, wherein
   the first dielectric layer includes a first interposition part interposed between the first evanescent light generating surface and the first metal layer,
   the third dielectric layer includes a second interposition part interposed between the second evanescent light generating surface and the second metal layer,
   the first surface plasmon is excited based on the first evanescent light, and
   the second surface plasmon is excited based on the second evanescent light.

4. A thermally-assisted magnetic recording head comprising:
   a medium facing surface facing a recording medium;
   a main pole that produces a write magnetic field for writing data on the recording medium;
   a core through which light is propagated; and
   a near-field light generator, wherein
      the near-field light generator includes a multilayer structure having a front end face located in the medium facing surface,
      the multilayer structure includes a first dielectric layer, a second dielectric layer, a third dielectric layer, a first metal layer, and a second metal layer,
      the first metal layer is interposed between the first dielectric layer and the second dielectric layer,
      the second metal layer is interposed between the second dielectric layer and the third dielectric layer,
      each of the first to third dielectric layers and the first and second metal layers has an end located in the front end face, each of the first and second metal layers is formed of a metal material, each of the first to third dielectric layers is formed of a dielectric material, the dielectric material used to form the first dielectric layer, the dielectric material used to form the second dielectric layer, and the dielectric material used to form the third dielectric layer have the same permittivity, the near-field light generator is configured so that the first metal layer propagates a first surface plasmon that is excited based on the light propagated through the core, the second metal layer propagates a second surface plasmon that is excited based on the light propagated through the core, and the front end face generates near-field light based on the first and second surface plasmons, the core has an evanescent light generating surface that generates evanescent light based on the light propagated through the core, the first dielectric layer includes an interposition part interposed between the evanescent light generating surface and the first metal layer, and the first and second surface plasmons are excited based on the evanescent light generated from the evanescent light generating surface.

5. A thermally-assisted magnetic recording head comprising:

a medium facing surface facing a recording medium;

a main pole that produces a write magnetic field for writing data on the recording medium;

a core through which light is propagated; and a near-field light generator, wherein the near-field light generator includes a multilayer structure having a front end face located in the medium facing surface, the multilayer structure includes a first dielectric layer, a second dielectric layer, a third dielectric layer, a first metal layer, and a second metal layer, the first metal layer is interposed between the first dielectric layer and the second dielectric layer, the second metal layer is interposed between the second dielectric layer and the third dielectric layer, each of the first to third dielectric layers and the first and second metal layers has an end located in the front end face, each of the first and second metal layers is formed of a metal material, each of the first to third dielectric layers is formed of a dielectric material, the dielectric material used to form the first dielectric layer, the dielectric material used to form the second dielectric layer, and the dielectric material used to form the third dielectric layer have the same permittivity, the near-field light generator is configured so that the first metal layer propagates a first surface plasmon that is excited based on the light propagated through the core, the second metal layer propagates a second surface plasmon that is excited based on the light propagated through the core, and the front end face generates near-field light based on the first and second surface plasmons, the core has a first evanescent light generating surface and a second evanescent light generating surface opposed to each other with a predetermined distance therebetween, the first evanescent light generating surface generates first evanescent light based on the light propagated through the core, the second evanescent light generating surface generates second evanescent light based on the light propagated through the core, and the multilayer structure is interposed between the first evanescent light generating surface and the second evanescent light generating surface.

6. The thermally-assisted magnetic recording head according to claim 5, wherein the first dielectric layer includes a first interposition part interposed between the first evanescent light generating surface and the first metal layer, the third dielectric layer includes a second interposition part interposed between the second evanescent light generating surface and the second metal layer, the first surface plasmon is excited based on the first evanescent light, and the second surface plasmon is excited based on the second evanescent light.

* * * * *